US009057824B2

(12) United States Patent
Gollier et al.

(10) Patent No.: US 9,057,824 B2
(45) Date of Patent: Jun. 16, 2015

(54) DISPLAY DEVICES HAVING AN ANTIGLARE LAYER PROVIDING REDUCED SPARKLE APPEARANCE

(71) Applicant: Corning Incorporated, Corning, NY (US)

(72) Inventors: Jacques Gollier, Painted Post, NY (US); Jean-Marc Martin Gerard Jouanno, Painted Post, NY (US); Garrett Andrew Piech, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 75 days.

(21) Appl. No.: 14/046,466

(22) Filed: Oct. 4, 2013

(65) Prior Publication Data

US 2014/0176827 A1     Jun. 26, 2014

Related U.S. Application Data

(60) Provisional application No. 61/712,000, filed on Oct. 10, 2012.

(51) Int. Cl.
*G02B 1/10* (2006.01)
*G02F 1/1335* (2006.01)

(52) U.S. Cl.
CPC ............ *G02B 1/10* (2013.01); *G02F 1/133502* (2013.01); *G02F 2001/133562* (2013.01)

(58) Field of Classification Search
CPC .......... G02F 1/133528; G02F 1/13338; G02F 1/1368; G02F 1/133502; G02F 1/1335; G02F 1/133526; G02F 1/1362; G02F 2202/28; G02F 2001/133562; G02F 2001/50; G02F 2201/38; G02B 5/3025; G02B 5/30; G02B 1/105; G02B 1/10; G02B 6/003; G09G 2320/066; G09G 2320/068; G09G 2320/0233; G06F 2203/04103
USPC ......... 349/96, 112, 12, 117; 359/488.01, 290, 359/291, 586, 601; 427/162, 163.1; 362/618
See application file for complete search history.

(56) References Cited

U.S. PATENT DOCUMENTS

2011/0267697 A1    11/2011   Kohli et al. .................... 359/609
2012/0218640 A1     8/2012   Gollier et al. ................. 359/609

FOREIGN PATENT DOCUMENTS

JP    2011-209701    10/2011
WO   2012/166407    12/2012

OTHER PUBLICATIONS

European Patent Office; International Search Report; Mailing Date: Jan. 7, 2014; pp. 1-3.

*Primary Examiner* — Thoi Duong
(74) *Attorney, Agent, or Firm* — Robert P. Santandrea

(57) ABSTRACT

Display devices and antiglare layers that minimize glare and the appearance of sparkle are described. One type of display device includes a pixel substrate, having a pixel array, and an antiglare layer. The antiglare layer has a surface roughness with a spatial frequency such that a typical focal length of the antiglare layer is either at least four times larger than an optical distance between a surface of the array of pixels and the antiglare layer, or at least three times smaller than the optical distance between the surface of the array of pixels and the antiglare layer. In some embodiments, a pixel pitch of the array of pixels is less than 120 μm. In some embodiments, the antiglare layer may have a power spectral density that is elliptical, with a minor axis of the power spectral density aligned with a color direction of the array of pixels.

24 Claims, 26 Drawing Sheets

DISPLAY DEVICES HAVING AN ANTIGLARE LAYER PROVIDING REDUCED SPARKLE APPEARANCE

This application claims the benefit of priority under 35 U.S.C. §119 of U.S. Provisional Application Ser. No. 61/712,000 filed on Oct. 10, 2012 the content of which is relied upon and incorporated herein by reference in its entirety.

BACKGROUND

1. Field

The present specification generally relates to display devices having an antiglare layer and, more particularly, to display devices having an antiglare layer that minimizes both glare and the appearance of sparkle.

2. Technical Background

The presence of glare is a significant issue in display devices, particularly when the display devices are viewed outdoors or in a brightly lit environment. Accordingly, some display devices utilize an anti-reflective coating on the front surface of the display to eliminate reflections from the front face of the display. However, use of only an anti-reflective coating may be insufficient because a significant amount of light remains reflected by the various layers that are inside the display device itself. Therefore, some display devices attempt to eliminate reflections by either using an antiglare treatment on the front surface of the display device, or a combination of both antiglare and antireflective treatments.

However, as the resolution of display devices increases, particularly display devices used in handheld electronic devices, pixel pitch of the array of pixels is significantly shrinking. When using an antiglare treatment within the display device structure, the antiglare layer creates an image artifact called "sparkle." To minimize the effect of sparkle, the roughness of the antiglare treatment or surface may be designed to have high spatial frequencies. However, higher spatial frequencies create significant haze and decreases image contrast.

SUMMARY

A first aspect of the disclosure is a display device that includes a pixel substrate having an array of pixels, and an antiglare layer positioned with respect to the pixel substrate. The antiglare layer has a surface roughness with a spatial frequency such that a typical focal length of the antiglare layer is either at least four times larger than an optical distance between a surface of the array of pixels and the antiglare layer, or at least three times smaller than the optical distance between the surface of the array of pixels and the antiglare layer.

A second aspect of the disclosure is the display device of the aforementioned aspect, wherein the typical focal length of the antiglare layer is at least three times smaller than the optical distance between the surface of the array of pixels and the antiglare layer, and a power spectral density of the antiglare layer has an annulus shape.

A third aspect of the disclosure is the display device of any preceding aspect, wherein the optical distance from the array of pixels to the antiglare layer is less than 0.30 mm.

A fourth aspect of the disclosure is the display device of any preceding aspect, wherein an amplitude of a phase modulation of light transmitted by the antiglare layer is at least 100 nm.

A fifth aspect of the disclosure is the display device of any preceding aspect, further including a color filter substrate adjacent to the pixel substrate, and a polarizer substrate adjacent to the color filter substrate, wherein the antiglare layer is positioned on a surface of the polarizer substrate.

A sixth aspect of the disclosure is the display device the fifth aspect, wherein a thickness of the polarizer substrate is about 0.1 mm.

A seventh aspect of the disclosure is the display device of any one of the first through fourth aspects, further including a color filter substrate positioned on the surface of the array of pixels, and a touch-sensitive layer.

An eighth aspect of the disclosure is the display device of the seventh aspect, further including a cover glass substrate and an antireflective layer on a surface of the cover glass substrate.

A ninth aspect of the disclosure is the display device of the seventh aspect, further including a polarizer substrate, wherein the touch-sensitive layer is positioned on the color filter substrate or the pixel substrate, and the antiglare layer is positioned on an outer surface of the polarizer substrate.

A tenth aspect of the disclosure is the display device of the ninth aspect, further including a cover glass substrate and an antireflective layer positioned on an outer surface of the cover glass substrate.

An eleventh aspect of the disclosure is the display device of any preceding aspect, wherein the surface roughness of the antiglare layer is defined by periods greater than 40 µm.

A twelfth aspect of the disclosure is the display device of any preceding aspect, wherein a pixel pitch of the array of pixels is less than 120 µm.

A thirteenth aspect of the disclosure is the display device of any preceding aspect, wherein a pixel pitch of the array of pixels is about 80 µm.

A fourteenth aspect of the disclosure is the display device of any preceding aspect, wherein the surface of the antiglare layer is defined by surface features providing an elliptical power spectral density.

A fifteenth aspect of the disclosure is the display device of the fourteenth aspect, wherein the elliptical power spectral density has a minor axis aligned with a color direction of the array of pixels.

A sixteenth aspect of the disclosure is the display device of any one of the first through thirteenth aspects, wherein the surface of the antiglare layer is defined by non-rotationally symmetric surface features.

A seventeenth aspect of the disclosure is the display device of any preceding aspect, wherein the antiglare layer is provided on an antiglare glass substrate.

An eighteenth aspect of the disclosure is the display device of any preceding aspect, wherein a pixel pitch of the array of pixels is less than about 120 µm, and the optical distance from the pixel substrate to the antiglare layer is less than about 0.30 mm.

A nineteenth aspect of the disclosure is a display device that includes a pixel substrate having an array of pixels, and an antiglare layer positioned with respect to the pixel substrate. The antiglare layer includes a surface roughness having a spatial frequency such that a typical focal length of the antiglare layer is at least four times larger than an optical distance between a surface of the array of pixels and the antiglare layer, wherein surface features of the antiglare layer are non-rotationally symmetric. The display device further includes a color filter substrate positioned on the surface of the array of pixels, a touch-sensitive layer, and a polarizer substrate.

A twentieth aspect of the disclosure is the display device of the nineteenth aspect, further including a cover glass substrate positioned adjacent to the touch-sensitive layer, and an antireflective layer on an outer surface of the cover glass substrate.

A twenty-first aspect of the disclosure is the display device of the nineteenth or twentieth aspect, wherein the surface features provide an elliptical power spectral density having a minor axis that is aligned with a color direction of the array of pixels.

A twenty-second aspect of the disclosure is the display device of any one of the nineteenth through twenty-first aspects, wherein the optical distance between the surface of the array of pixels and the antiglare layer is less than or equal to 0.30 mm.

A twenty-third aspect of the disclosure is a display device that includes a pixel substrate having an array of pixels, and an antiglare layer positioned with respect to the pixel substrate, the antiglare layer having a surface roughness having a spatial frequency such that a typical focal length of the antiglare layer is at least four times larger than an optical distance between a surface of the array of pixels and the antiglare layer.

A twenty-fourth aspect of the disclosure is a display device that includes a pixel substrate having an array of pixels, and an antiglare layer positioned with respect to the pixel substrate. The antiglare layer includes a surface roughness having a spatial frequency such that a typical focal length of the antiglare layer is at least three times smaller than an optical distance between a surface of the array of pixels and the antiglare layer, and a power spectral density of the antiglare layer has an annulus shape.

Additional features and advantages of the embodiments described herein will be set forth in the detailed description which follows, and in part will be readily apparent to those skilled in the art from that description or recognized by practicing the embodiments described herein, including the detailed description that follows, the claims, as well as the appended drawings.

It should be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of display devices having an antiglare treatment to reduce the appearance of glare present by reflections of light off an outer surface of the display device, as well as reflections of light off internal surfaces within the display device. More specifically, embodiments are directed to antiglare layers and display devices wherein the antiglare layer has a typical focal length that is larger than an optical distance of the antiglare layer to a pixel substrate having an array of pixels (e.g., at least four times larger). In other embodiments, particularly where a power spectral density of the antiglare layer is an annulus shape, the typical focal length may be smaller than the optical distance of the antiglare layer to the pixel substrate (e.g., at least three times smaller). Various embodiments of antiglare layers and display devices will be described in more detail herein with specific reference to the appended drawings.

"Antiglare" or like terms refer to a physical transformation of light contacting a treated surface of an article, such as a display device, that changes, or to the property of changing light reflected from the surface of an article, into a diffuse reflection rather than a specular reflection. In embodiments described herein, an antiglare layer or treatment may be provided by a thin-film coating, or by mechanical or chemical etching in a glass substrate. Antiglare does not reduce the amount of light reflected from the surface, but only changes the characteristics of the reflected light. An image reflected by an antiglare layer has no sharp boundaries. In contrast to an antiglare layer, an anti-reflective surface is typically a thin-film coating that reduces the reflection of light from a surface via the use of refractive-index variation and, in some instances, destructive interference techniques.

Figure 12A:
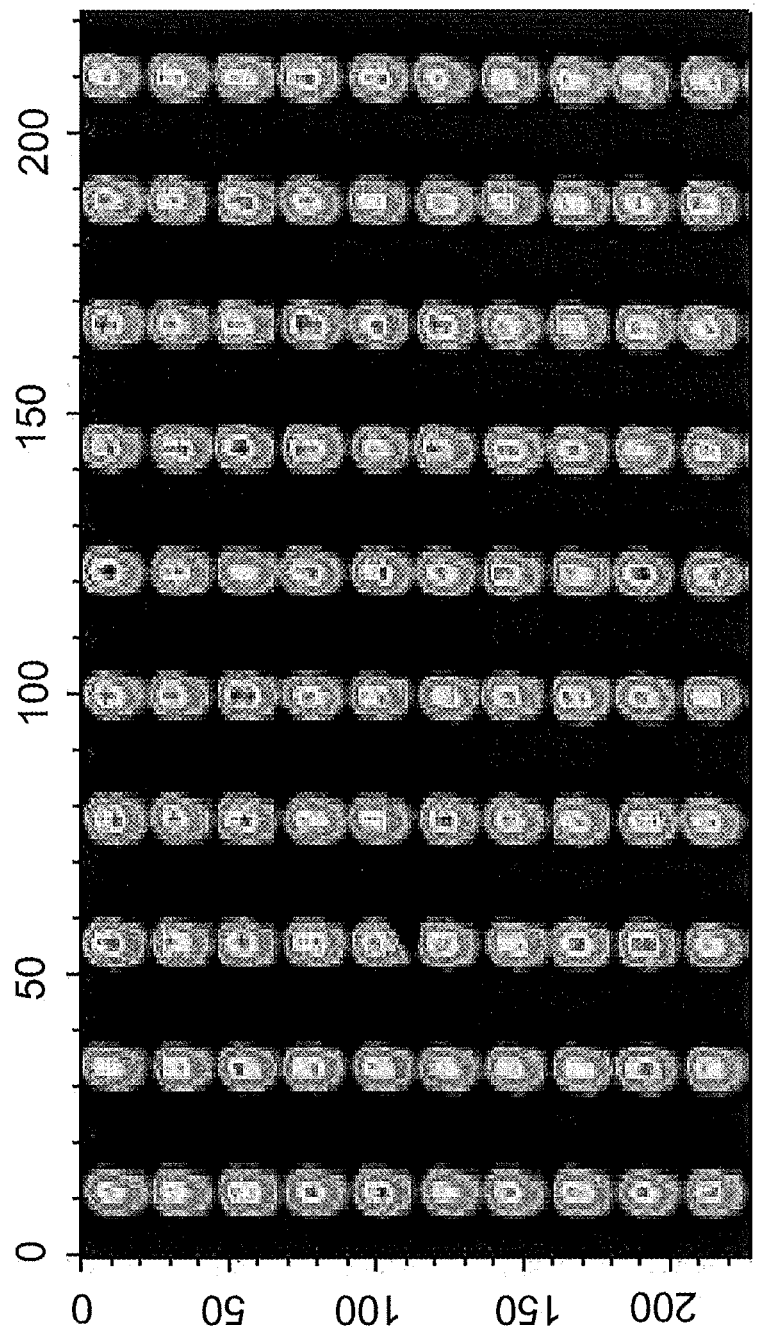
FIGS. 12A-12D are false-color images depicting sparkle produced by an antiglare layer sample at increasing distances from the array of pixels.
Figure 12B:
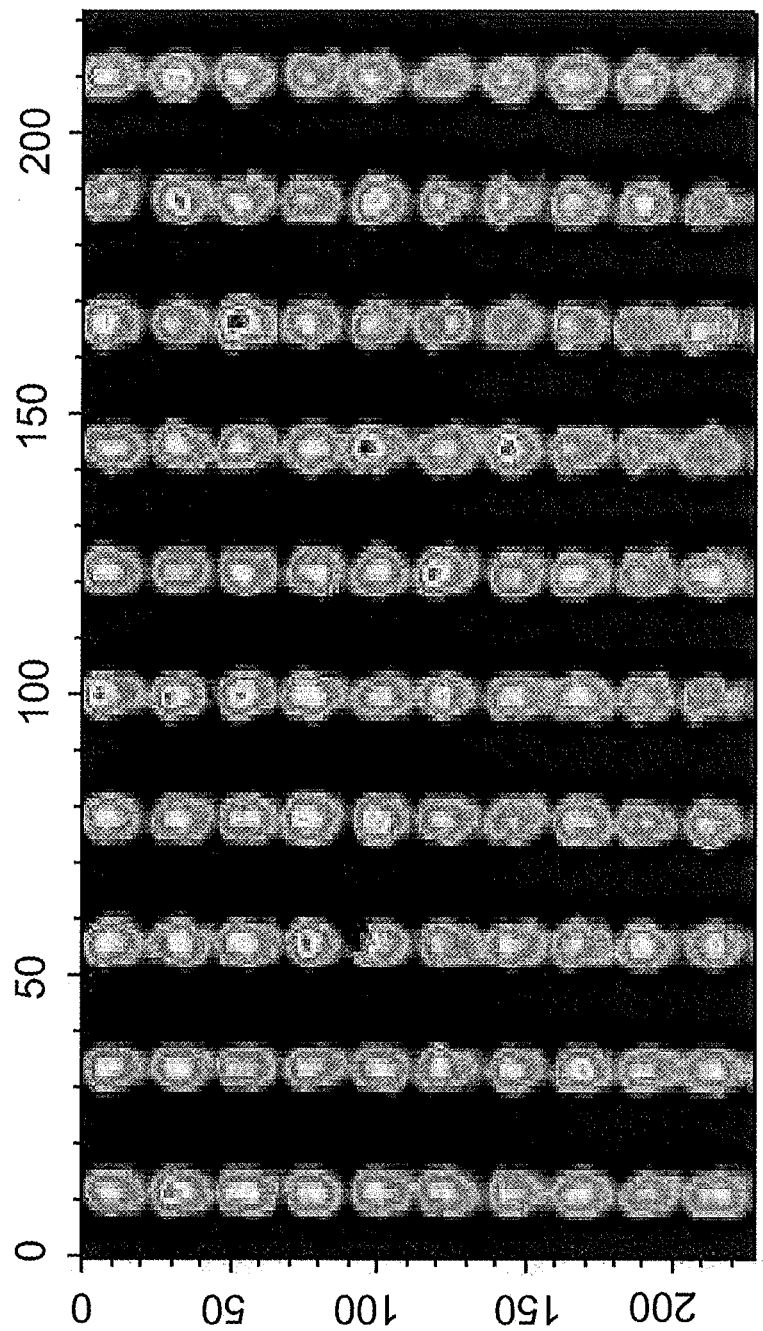
Figure 12C:
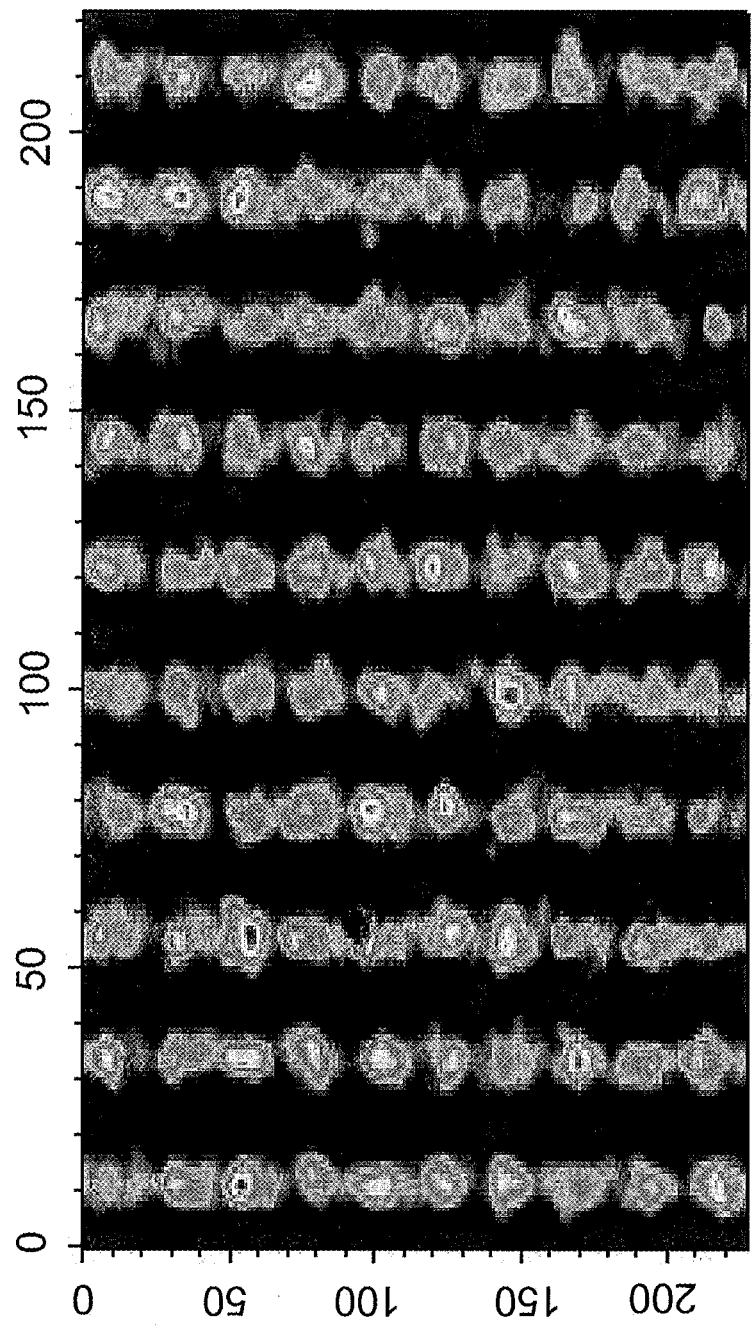
Figure 12D:
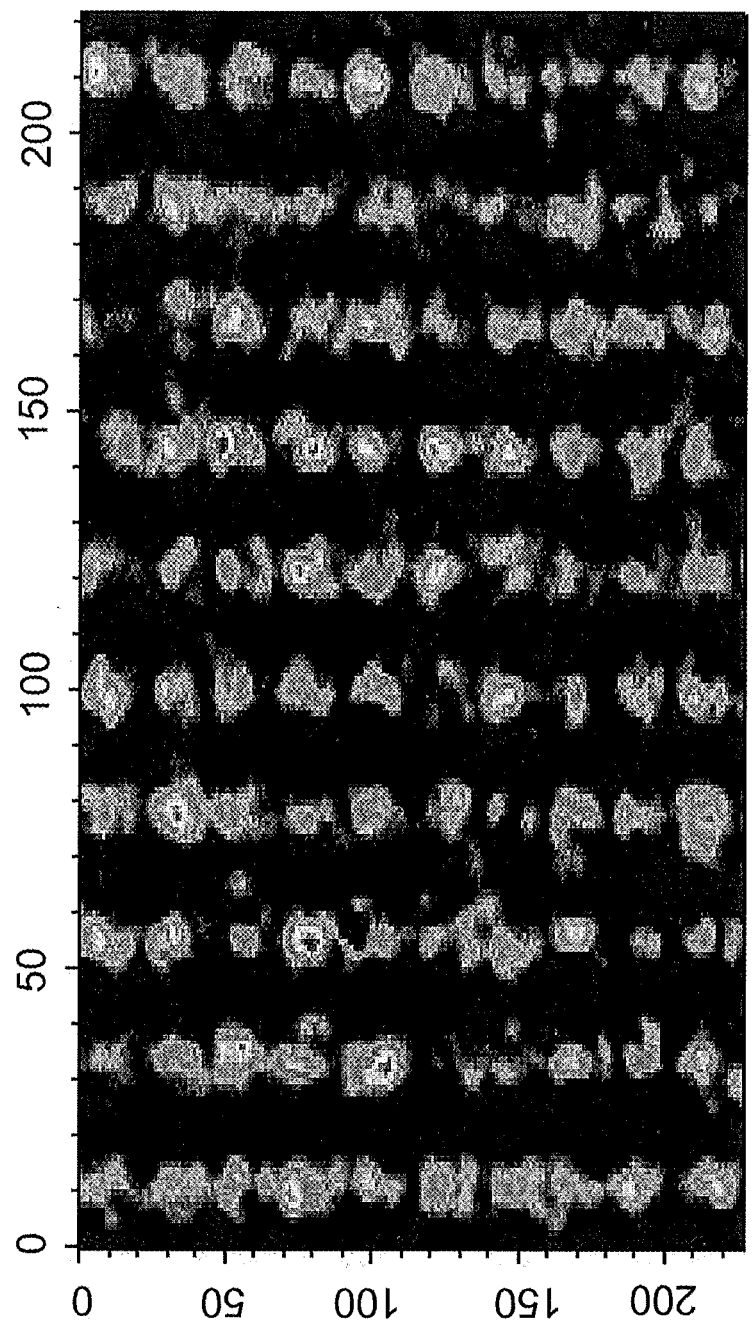

Display "sparkle" or "dazzle" is a generally undesirable side effect that can occur when introducing antiglare or light scattering surfaces into a pixelated display system such as, for example, a liquid crystal display (LCD), an organic light emitting diode (OLED), touch screens, or the like, and differs in type and origin from the type of "sparkle" or "speckle" that has been observed and characterized in projection or laser systems. Sparkle is associated with a very fine grainy appearance of the display, and may appear to have a shift in the pattern of the grains with changing viewing angle of the display. Display sparkle may be manifested as bright and dark or colored spots at approximately the pixel-level size scale. As will be described in more detail below, images of a first transparent glass sheet exhibiting no visible sparkle is depicted in FIG. 12A, while transparent glass sheets exhibiting increasing visible sparkle are shown in FIGS. 12B-12D. The sample shown in FIG. 12A does not exhibit any visible sparkle, and has pixel images that are regular and consistent with each other. In contrast, the images shown in FIGS. 12B-12D exhibit visible noise and some dispersion on the power-per-pixel. Consequently, the pixels in FIGS. 12B-12D are more diffuse and appear to merge together.

As described herein, it has been determined that the type of display sparkle that is commonly observed in pixelated displays combined with antiglare layers is primarily a refractive effect in which features having some macroscopic (i.e., much larger than optical wavelength) dimension on the surface cause refraction or "lensing" of display pixels into varying angles, thus modifying the apparent relative intensity of the pixels. A technique for quantifying this effect is provided herein and described in U.S. Pat. Publ. No. 2012/0221264 filed on Jan. 20, 2012, which is hereby incorporated by reference in its entirety. Generally, the technique measures the standard deviation of the total power collected from each display pixel using an 'eye simulator' camera system (i.e., a system that simulates the mechanics of the eye of a human observer) to calculate a power-per-pixel deviation ("PPD"). This metric correlates well to user judgments of display sparkle.

Figure 1A:
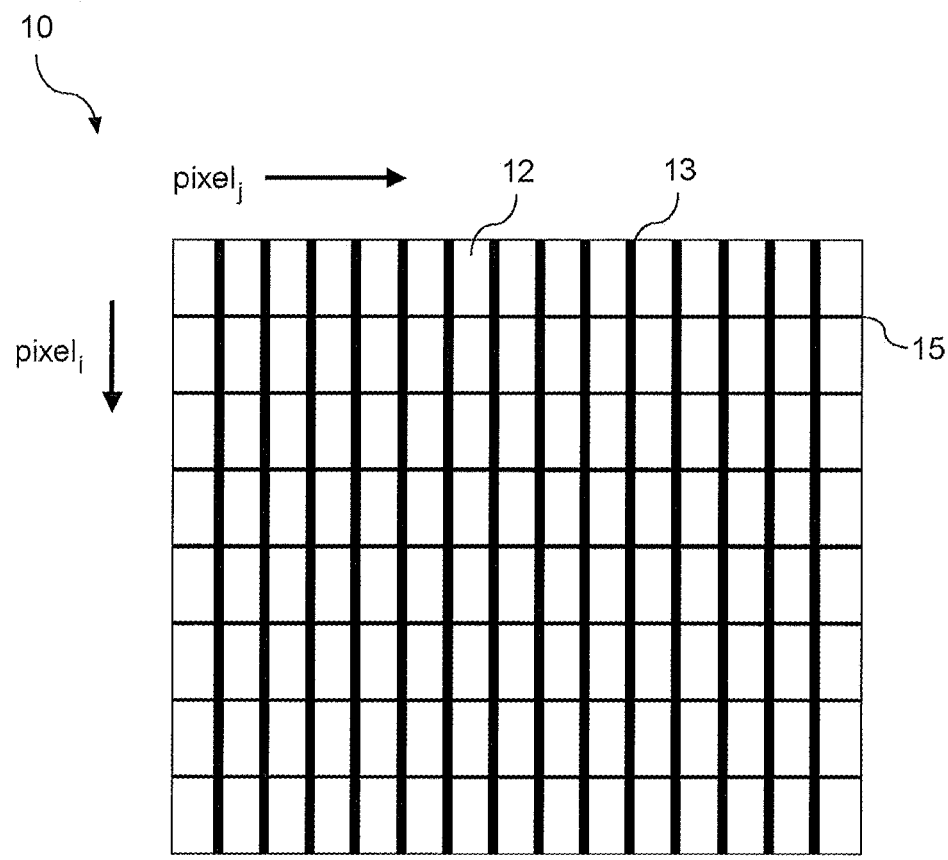
FIG. 1A schematically depicts an array of pixels of a display device.
Figure 1B:
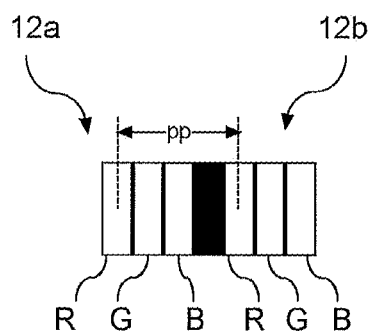
FIG. 1B schematically depicts sub-pixels of two adjacent pixels of the array of pixels depicted in FIG. 1A.

Referring now to FIG. 1A, a top view of an array of pixels 12 provided on a display panel 10 is schematically illustrated. Each pixel 12 is separated by vertical and horizontal bands 13, 15, which are the spaces between the individual pixels 12. The display panel 10 may be configured as any light-emitting pixelated display, such as LCD, OLED, active matrix organic light emitting diode (AMOLED), and the like. The pixels 12 of the display panel 10 illustrated in FIG. 1A are provided in a pixel array having reference indices i and j. As shown in FIG. 1B, an individual pixel may be comprised of several sub-pixels, such as the red (R), green (G) and blue (B) sub-pixels that are arranged in a color direction that is horizontal along the display panel 10. As used herein, pixel pitch pp is defined as the distance between sub-pixels of the same color. As used herein, the phrase "color direction" refers to the direction in which the sub-pixels are arranged (e.g., the R, G, B sub-pixels). It should be understood that embodiments are not limited to the shape and arrangement of the pixels of the array of pixels 12 depicted in FIGS. 1A and 1B, and that display panels 10 may have different individual pixel arrangements, as well as different pixel array arrangements (e.g., circular pixels and/or sub-pixels, PenTile matrix pixels, red-green-blue-green pixels, etc.).

Figure 2:
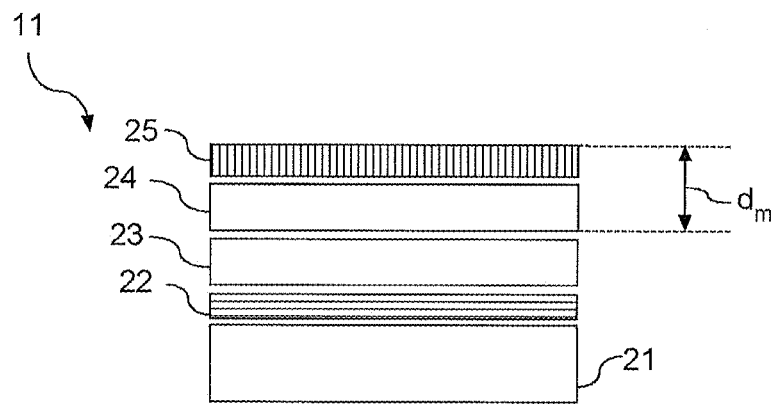
FIG. 2 schematically depicts layers of a non-touch-sensitive display device.
Figure 3:
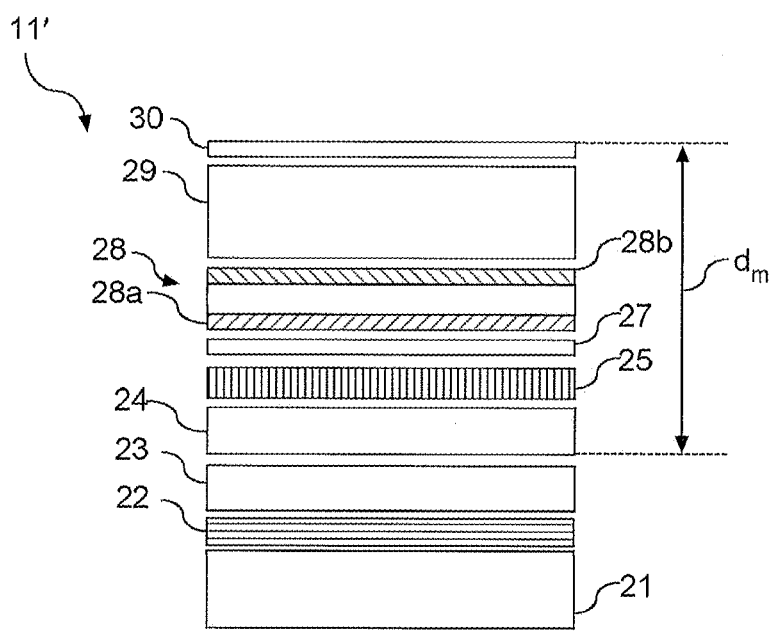
FIG. 3 schematically depicts layers of a touch-sensitive display device.

FIGS. 2 and 3 schematically depict a non-touch sensitive capable display device 11 and a touch-sensitive capable display device 11', respectively, with both being configured as LCD display devices. It should be understood that embodiments are not limited to the configurations depicted in FIGS. 2 and 3, and that more or fewer layers may be provided in the embodiments described herein. As described in more detail below, touch-sensitive display devices are devices that are electrically responsive to receiving input from the touch and gestures of a human hand. Referring initially to the non-touch sensitive display device 11 of FIG. 2, the display device 11 generally comprises a backlight 21 (e.g., a fluorescent backlight, a light emitting diode ("LED") backlight, and the like), a first polarizer layer 22, a pixel substrate 23 (i.e., a thin-film transistor ("TFT") layer), a color filter substrate 24, and a second polarizer substrate 25. The pixel substrate 23 and the color filter substrate 24 may each comprise a glass substrate, for example. The pixel substrate 23 and the color filter substrate 24 are configured to provide the array of pixels 12. The first and second polarizer substrates 22, 25 may allow light of a particular polarization to pass therethrough (e.g., a linear polarizer that allows the horizontal component or the vertical component of light to pass). It should be understood that additional or fewer polarizer substrates may also be provided. As a nonlimiting example, in OLED displays, the display device generally includes a circular polarizer (e.g., a quarter wave plate and a linear polarizer) to eliminate the reflection of ambient light from the cathode of the display. Further, it should also be understood that additional adhesive layers may also be provided between the layers depicted in FIGS. 2 and 3.

By reducing the thickness of the pixel substrate 23, the second polarizer substrate 25, and adhesive layers to thin dimensions, such as 0.10 mm each, for example, a mechanical thickness $d_m$ of about 0.30 mm may be present between a surface of the pixel substrate 23 and a top surface of the second polarizer substrate 25. The mechanical thickness is measured from a bottom surface of the color filter substrate 24. Assuming an index of refraction of 1.5 for the pixel substrate 23, the second polarizer substrate 25, and the adhesive layers, this yields an optical distance of about 0.20 mm. It is noted that in LCD displays, images are created by the color filters of the color filter substrate and, as such, the mechanical distance from the array of pixels is measured from a back surface of the color filter substrate. In emissive displays, such as OLED displays, the image is created by the OLED layer itself, and, in this case, the mechanical distance from the array of pixels is measured from the OLED layer. As used herein, the phrase "optical distance" is defined as the mechanical distance divided by the index of refraction of the materials that are in the optical path. When multiple materials with different indices of refraction are used, the total optical distance is equal to the sum of the optical distance of the individual materials. As described in more detail below, reducing the optical distance between the array of pixels and an antiglare layer reduces the amplitude of sparkle visible to an observer.

Referring to FIG. 3, in the case of touch-sensitive applications, some additional layers are needed for the capacitive sensor films (touch sensitive substrate 28), such as indium tin oxide ("ITO"), and a cover glass substrate 29. In the illustrated touch-sensitive display device 11', the touch-sensitive substrate 28 is a glass substrate having a first ITO layer 28a providing touch sensing capability in a first direction (e.g., a y-axis direction) and a second ITO layer 28b providing touch sensing capability in a second, opposite direction (e.g., an x-axis direction). A shield layer or an air gap is disposed between the second polarizer substrate 25 and the touch-sensitive substrate 28. The cover glass substrate 29 is positioned on the touch-sensitive substrate 28. Additionally, an antireflective layer 30, which may be configured as an anti-reflective film or coating, is disposed on an outer surface of the cover glass substrate 29. As depicted in FIG. 3, the additional layers of the touch-sensitive display device 11' increase the mechanical and optical distance between the bottom surface of the color filter substrate 24 and a top surface of the cover glass substrate 29 or the antireflective layer 30, which may increase the amplitude of sparkle compared to the non-touch sensitive display device 11 depicted in FIG. 2.

Sparkle may be quantified by a standardized metric referred to herein as power-per-pixel deviation ("PPD"), which is based on the consideration that most displays are designed in such a way that a human observer cannot resolve features that are smaller than the pixel size at a typical viewing distance for a given display type. As such, the noise inside single pixels does not matter, and only the noise between different pixels is significant with respect to sparkle.

Figure 4:
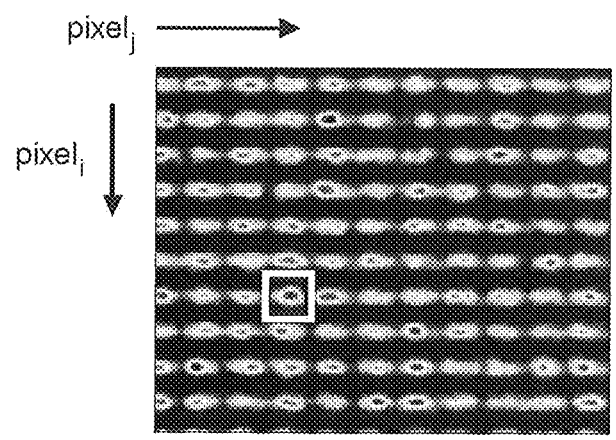
FIG. 4 is an image depicting sparkle in 10×10 LCD pixels.

Therefore, sparkle may be quantified by PPD, which is a process that, given a pixelated image of a given single color (R, G or B), defines a window around individual pixels with a size equal to the pixel pitch pp. It is noted that the PPD process is described generally herein, and that additional information regarding the PPD process is also provided in U.S. patent application Ser. No. 13/354,827, referenced above. FIG. 4 provides a false-color experimental image of 10×10 LCD pixels that shows sparkle resulting from the presence of an antiglare surface. A single window is illustrated as a white square around a single pixel. The width of the square is equal to the pixel pitch pp.

Generally, the power inside the window is integrated, and PPD is defined as the standard deviation of the integrated power for each pixel normalized to the average power-per-pixel, as provided below:

$$P_{i,j} = \int P_{window}$$

$$PPD = STD(P_{i,j})/mean(P_{i,j})$$

Figure 5:
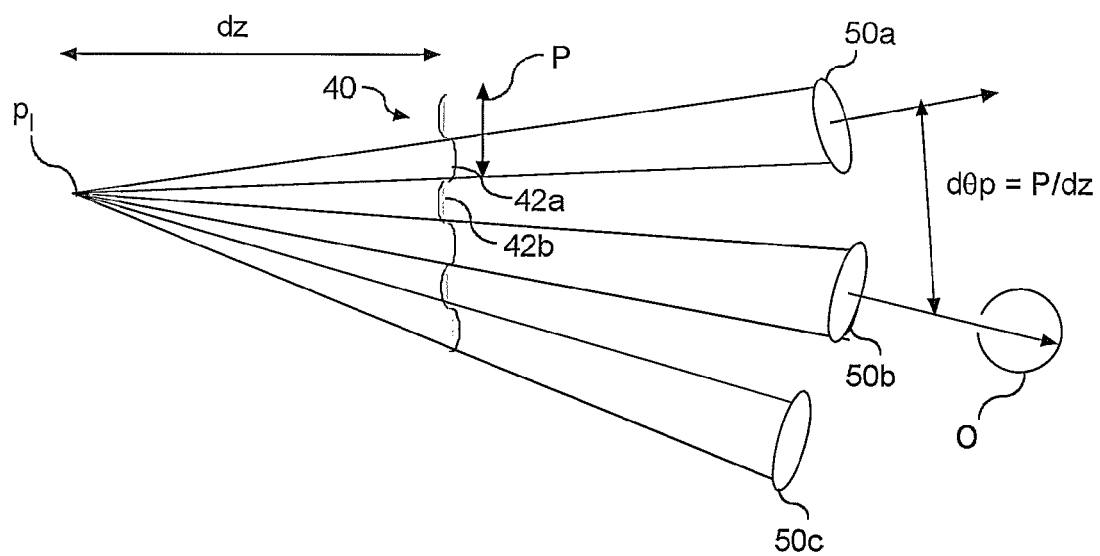
FIG. 5 schematically depicts a single monochromatic point $p_1$ source hitting a periodic phase plate to produce alternative bright and dark region in the far field close to an observer.

Referring now to FIG. 5, to build a sparkle model, let us consider the simplistic case of a single monochromatic point $p_1$ source hitting a periodic phase plate 40 which represents a diffusing surface having features (e.g., features 42a, 42b) that generate sparkle. From a purely geometrical point of view, the expectation is that the periodic phase plate 40 will create a few fringes in the far field and those fringes will be bright (represented by bright regions 50a-50c) or dark (regions between bright regions 50a-50c) where the periodic phase plate 40 is concave (e.g., feature 42a) or convex (e.g., feature 42b). Accordingly, the periodic surface causes the formation of bright and dark fringes at well-defined angles separated by $d\theta_p$. Assuming a periodic phase function for simplicity, the expectation is that the far field would be a periodic function with an angular period given by:

$$d\theta_p = P/dz, \qquad \text{Equation 1}$$

where:
$d\theta_p$ is the angular period in the far field,
P is the period of the phase plate, and
dz is the distance from the emitting point to the phase plate (i.e., the antiglare layer or surface).

If we now consider an observer located in the far field of the display, he or she will have the impression that the emitting point $p_1$ is darker or brighter depending on where the eye pupil is located with respect to those fringes. In pixelated displays, the source is not a point source, and the real size of the individual pixels should be taken into account. Still based on geometrical optics, the far field emitted by a point $p_2$ located at a distance dy from a first point $p_1$ will be the same as the one emitted by the first point $p_1$ shifted by an angle given by:

$$d\theta_s = dy/dz, \qquad \text{Equation 2}$$

where $d\theta_s$ is the angular shift associated with a shift dy of the emitting point.

Therefore, when considering a continuous pixel with an extension dL, and assuming that light is not coherent inside the pixel, the intensity distribution into the far field may be given by:

$$Iff_{p1}(\theta) = Iff_{p0}(\theta) * rect(\theta/(dL/dz)), \qquad \text{Equation 3}$$

where:
$Iff_{p0}$ is the far field intensity for one single point source,
rect is a rectangular function,
dL is the pixel size,
$Iff_{p1}$ is the far field intensity emitted by the entire pixel, and
* is a convolution product.

Next, how much power makes its way to the retina of an observer for that specific pixel may be calculated by:

$$P = \int_{Eye-pupil} Iff_{p1}(\theta)d\theta, \qquad \text{Equation 4}$$

where:
P is the power perceived by an observer, and
the integration window equals the eye pupil angular extent.

To calculate the PPD which corresponds to the deviation of the perceived power-per-pixel, many different pixels located at random positions with respect to the phase plate should be considered. Per Eq. 2 above, the far field for other pixels does not need to be recalculated because it is known that all the additional far field images will be the same, only shifted by a given angle. Therefore, rather than re-calculating the far field patterns for pixels randomly located with respect to the periodic phase plate 40, the power P may be recalculated while considering that the observer eye is randomly located inside the far field. Consequently, PPD may be obtained by:

$$Iff_{p2}(\theta) = Iff_{p1}(\theta) * rect(\theta/\theta_{eye}), \qquad \text{Equation 5}$$

$$PPD = STD(Iff_{p2})/mean(Iff_{p2}), \qquad \text{Equation 6}$$

where $\theta_{eye}$ is the angular extent of the eye.

It is noted that, in the previous calculation, it was assumed that the power-per-pixel deviation was exclusively due to the fact that the eye pupil collects variable amounts of power. However, there is another mechanism that can generate some fluctuation in the power per pixel. For high phase modulation frequency or amplitude, part of the power can be imaged on the retina outside the pixel widow. Consequently, this power does not contribute to the power integrated over the pixel window and therefore this power leakage is not taken into account in Eq. 6. Accordingly, this simplified model is only valid for phase modulations having a relatively small diffusion cone:

$$Ddz < \text{Pixel gap},\qquad \text{Equation 7a}$$

where:
D is the surface diffusion angle,
dz is the distance from the pixel to the diffusing surface, and
Pixel gap is the gap between pixels of a given color.

An example where the above equations do not apply is for non-pixelated images, such in black and white E-reader devices, where the gap between pixels is close to zero and there is never any sparkle, regardless of the roughness structure. This indicates an alternative strategy for minimizing display sparkle, which is to minimize or eliminate the gaps between display pixels.

Finally, it should be noted that the above equations assume a spectrally coherent source, which implies that they are only applicable to roughness amplitudes lower than the pixel coherency length:

$$dhdn < \lambda^2/d\lambda,\qquad \text{Equation 7b}$$

where:
dh is the roughness amplitude,
dn is the index contrast (about 0.5), and
dλ is the spectral width.

In antiglare surfaces, typical roughness amplitude is in the order of 200 nm RMS, which means that, even with a white source, the spectral coherency assumption is still valid.

Now, to solve Eqs. 1 to 6, the far field intensity corresponding to one single emitting point needs to be calculated. This calculation may be performed by considering a spherical wave hitting the phase plate, and calculating the electric field $\text{Eff}_{p0}$ in the far field by using Fourier optics:

$$\text{Eff}_{p0} = FFT[\exp(2\pi x^2/2dz\lambda + i\Phi(x))] \qquad \text{Equation 8}$$

$$\text{iff}_{p0} = \text{abs}(\text{Eff}_{p0})^2$$

Figure 6:
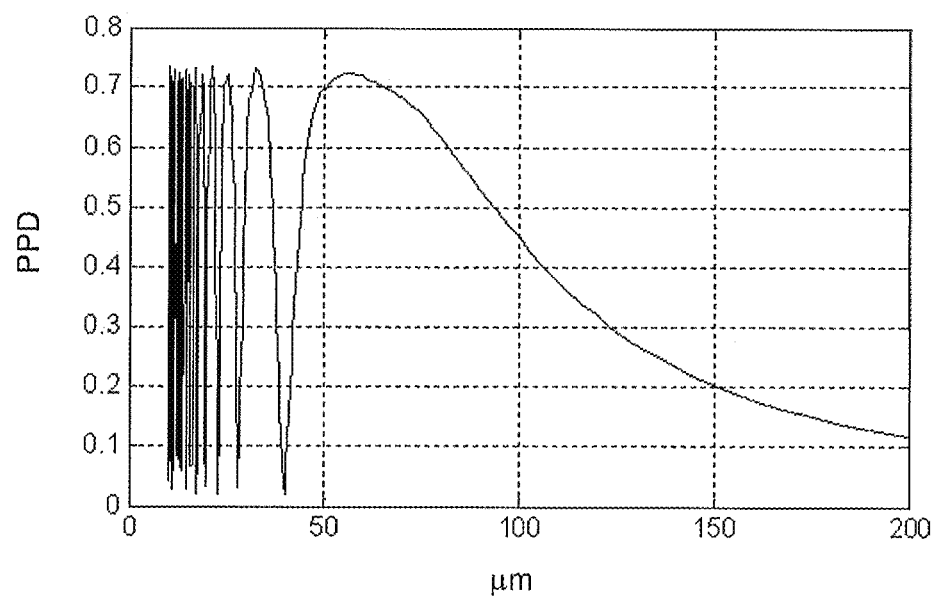
FIG. 6 graphically depicts power-per-pixel deviation ("PPD") versus roughness period assuming infinitely small pixels and infinitely small eye pupil diameter.

The chart of FIG. 6 depicts the calculated PPD assuming infinitely small pixels and infinitely small eye pupil diameter with a sinusoidal periodic phase plate. The wavelength was fixed at 532 nm. The chart of FIG. 6 plots PPD versus the roughness period T. The phase amplitude is set at 0.1 in units of 2π, and the distance from the pixel to the sinusoidal periodic phase plate is fixed to 3 mm.

It can be shown that, due to interference effects, there are some specific roughness frequencies where the contrast of the fringes in the FFP falls to zero. Those frequencies, also known as the Talbot frequency, are given by:

$$\lambda dz/T^2 = k,\qquad \text{Equation 9}$$

where:
T is the roughness period, and
k is an integer number.

Figure 7:
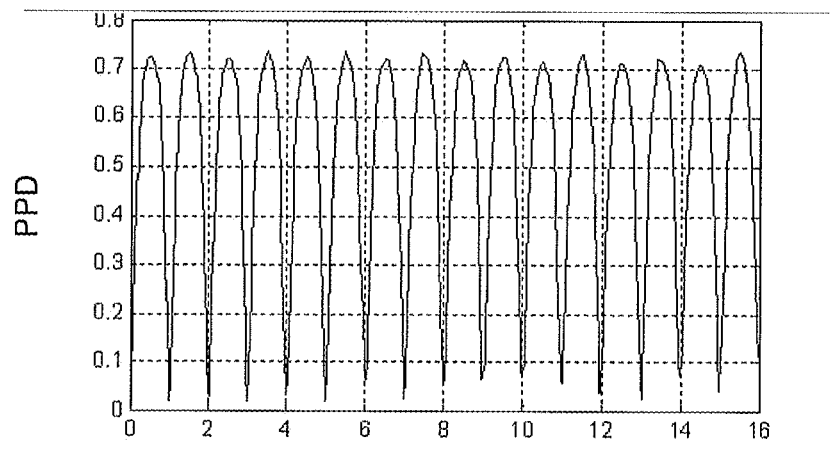
FIG. 7 graphically depicts PPD as a function of $\lambda \, dz/T^2$ where T is the roughness period, assuming infinitely small pixels and infinitely small eye pupil diameter.

Therefore, by plotting the PPD as a function of $\lambda\, dz/T^2$ instead of as a function of the roughness period, a perfectly periodic function is obtained, as depicted in the chart of FIG. 7.

Figure 8:
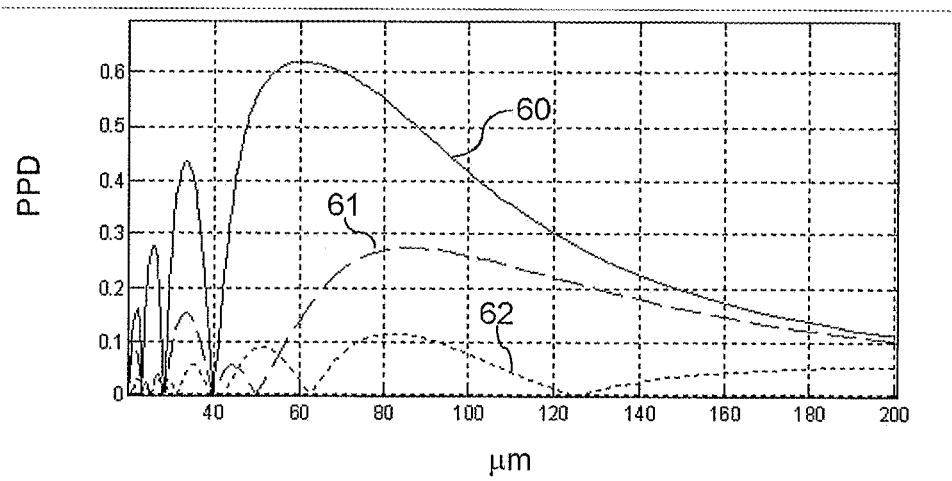
FIG. 8 graphically depicts PPD versus roughness period assuming a finite pixel size and an infinitely small eye pupil diameter.

To consider real pixel sizes, the convolution product of Eq. 3 may be applied that results in washing out the contrast of the fringes for high-frequency periodic phase plates. FIG. 8 depicts the calculated PPD as a function of the roughness period for pixel pitches equal to 70 μm corresponding to high-resolution displays, such as Retina displays (curve 60), 200 μm corresponding to computer monitor displays (curve 61), and 500 μm corresponding to large televisions (curve 62). It is noted that the eye pupil diameter is still considered as infinitely small in the simulation plotted in FIG. 8. As may be seen in the plot, PPD for high-frequency roughness gets significantly reduced. Also, for a given roughness frequency, PPD is always worse for smaller pixels.

Figure 9:
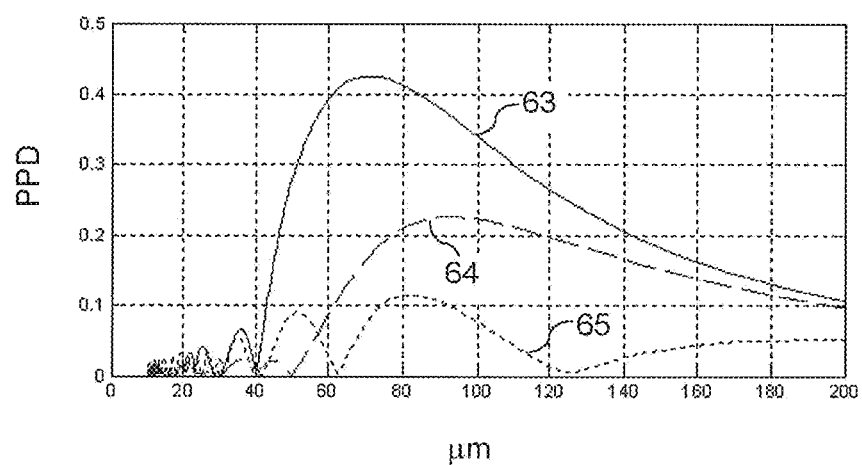
FIG. 9 graphically depicts PPD versus roughness period assuming a finite pixel size and a finite eye pupil diameter.

Finite eye pupil diameter may be taken into account by applying the additional convolution product from Eq. 5. FIG. 9 depicts the PPD calculated in the same conditions as provided in the chart of FIG. 8, except taking into account a 5 mm diameter eye pupil located 0.5 meters away from the screen in the case of the retina display and the computer display, and a 3 meter distance for the case of a large television. Similar to FIG. 8, Curve 63 represents a display having a 70 μm pixel pitch, curve 64 represents a display having a 200 μm pixel pitch, and curve 65 represents a display having a 500 μm pixel pitch.

The chart of FIG. 9 shows that, assuming that the distance from the array of pixels to the sinusoidal periodic phase plate 40 is about 3.0 mm, roughness periods larger than about 40 μm should be avoided to minimize sparkle. This trend was cross-validated by other numerical models and a semi-empirical evaluation of sample roughness.

Conventional antiglare layers or surfaces can generally be characterized by their power spectral density (PSD), which is the Fourier transform of the roughness shape. As used herein, the terms "roughness" or "surface roughness" refer to, on a microscopic level or below, an uneven or irregular surface condition, such as an average root mean squared ("RMS") roughness. The effect of the antiglare layer is to modulate the phase of the light that gets either reflected or transmitted by the antiglare layer. It can be shown that, to efficiently eliminate glare, the amplitude of phase modulation should be at least 100 nm RMS. As an example, when the antiglare layer is a roughened surface with an index of refraction of 1.5, the transmitted light will be mostly scattered (as opposed to transmitted), provided that the roughness amplitude is at least 200 nm RMS. In another example, the antiglare layer may be generated by a roughened surface between two media with indices $n_1$ and $n_2$. In this case, the amplitude of the roughness needs to be at least 100 nm divided by the difference between $n_1$ and $n_2$. Usually, the PSD can be approximated by Gaussian functions (or some more elaborated other functions) which are centered on zero. The consequence is that all the features on the antiglare layer present some low-frequency components which can generate some sparkle, especially when used with high-resolution displays. To minimize sparkle, one solution consists in increasing the $1/e^2$ frequency of the PSD Gaussian distribution as to put most of the roughness of the antiglare layer in the high frequencies rather than in the low frequencies. However, when increasing the spatial frequency of the roughness, light gets scattered into a larger angle resulting in increasing the haze of the surface and, in some cases (such as when the antiglare layer is located far from the array of pixels), the image can also become blurry.

As described in more detail below, other embodiments may minimize haziness and sparkle by the use of an antiglare layer having a power spectral density shape such that the low frequencies responsible for creating sparkle and the high frequencies responsible for creating haziness are eliminated (see FIGS. 25 and 26).

Figure 10A:
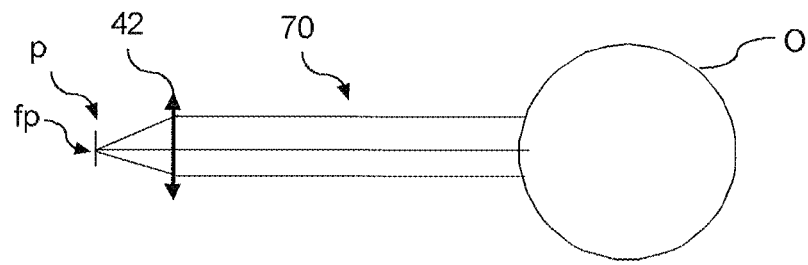
FIG. 10A schematically depicts a microlens and a pixel arranged such that the pixel is located at the focal plane of the micro lens.

Another important parameter in the above-described sparkle model is the distance from the pixel substrate 23 and the antiglare layer (e.g., the antiglare layer 480 depicted in FIGS. 14A and 14B, described below). To explain how the distance parameter can influence sparkle, consider that the antiglare layer features are configured as a series of microlenses. In other words, the peaks and values provided by the antiglare layer act as individual microlenses. Referring to FIG. 10A, the case where the pixel p is located close to the focal plane fp of the microlenses provided by the antiglare layer. Reference numeral 42 represents a single microlens having a focal plane fp at pixel p. In this case, light 70 gets nearly collimated and the entire surface of the microlens will either turn red, green, blue, or black depending whether the display surface seen by an eye of an observer O through the microlens is incident on a red, green, or blue pixel, or the black matrix located between the pixels. This situation leads to high amplitude sparkle that is easily visible to an observer.

Figure 10B:
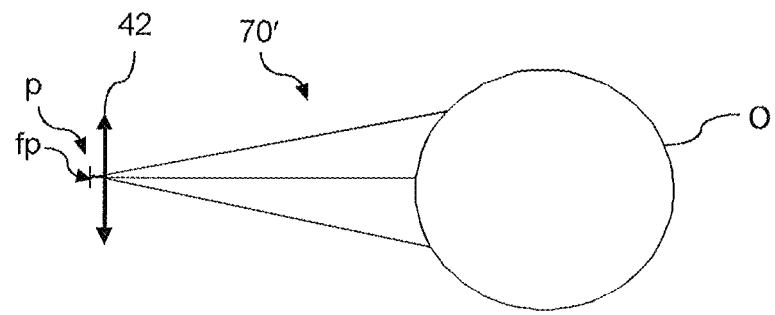
FIG. 10B schematically depicts a microlens positioned with respect to a pixel at a distance that is much smaller than the focal length of the microlens.

FIG. 10B illustrates the case where the microlenses 42 are located very close to the array of pixels p such that the distance between the array of pixels and the antiglare layer is much smaller than the focal length of the microlenses 42 provided by the antiglare layer. When putting a microlens 72 right on top of the emission point (pixel p), geometric optics (and Fourier optics) predict that the microlens 42 will not affect the way that light 70' is emitted, and there will be no light concentration at all. In this case, it may be expected that sparkle is completely eliminated. It can also be shown that setting the distance between the pixels and the microlenses much larger than the focal length of the microlenses can eliminate sparkle. However, this case may not be practical because the thickness of the display device becomes unrealistic.

Accordingly, an ideal situation is when the antiglare layer is located extremely close to the pixels of the display. However, having the antiglare layer right on top of the array of pixels is not a practical solution because there is a minimum distance needed to include the color filter substrate, the polarizer (in the case of a LCD display) and the TV cover (in the case of a touch screen, for instance). However, expectation is that, by minimizing that distance, sparkle can be dramatically reduced.

The influence of the distance between the array of pixels and the microlenses (i.e., antiglare layer) on sparkle was evaluated experimentally by fabricating a set-up consisting of imaging the pixels of an LCD display by using a pair of lenses, and placing an antiglare layer close to that image produced by the pair of lenses. The antiglare layer was coupled to an x, y, z stage such that the distance between the image and the antiglare layer was variable. The distance was varied and the sparkle amplitude versus distance was evaluated.

Figure 11:
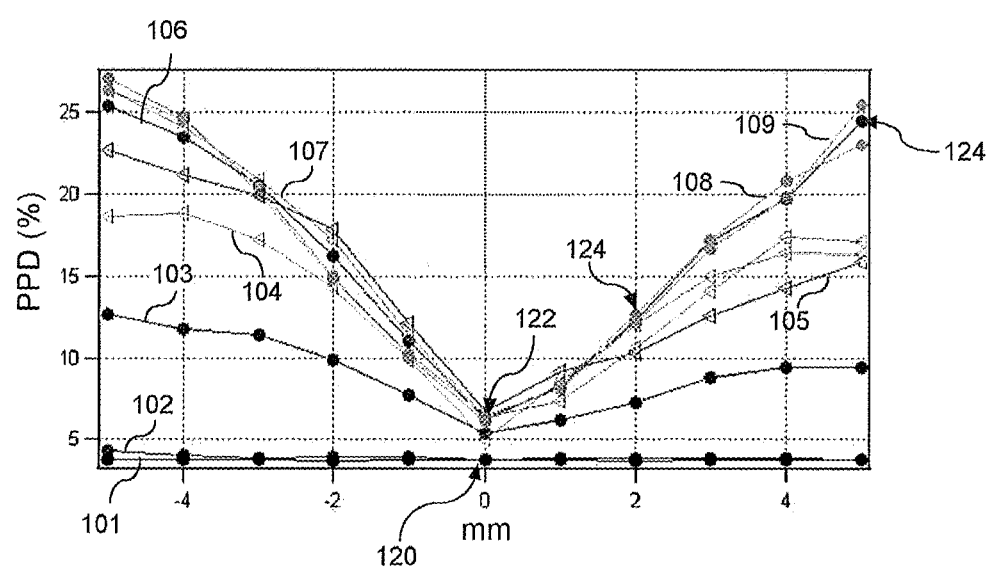
FIG. 11 graphically depicts the evolution of sparkle versus the antiglare to array of pixel distance for a variety of antiglare layer samples.

FIG. 11 is a chart that shows the evolution of sparkle versus the distance between the image of the pixels and the antiglare layer measured with several antiglare samples. Curves 101 and 102 each correspond to a glass substrate having no roughness, while curves 103-110 correspond to several roughness textures that differ in amplitude and shape.

As may be seen from FIG. 11, sparkle significantly drops when the distance gets close to zero. Also, that the sparkle did not go all the way to zero at a zero distance is thought to be a measurement artifact due to lens aberration and limitation in the lenses apertures. FIGS. 12A-12D depict measurement results at various distances and various samples. FIG. 12A depicts a measurement with no antiglare layer. FIGS. 12B, 12C and 12D depict measurement results of the sample associated with curve 106 at 0 mm, 2 mm and 5 mm, respectively.

Figure 13:
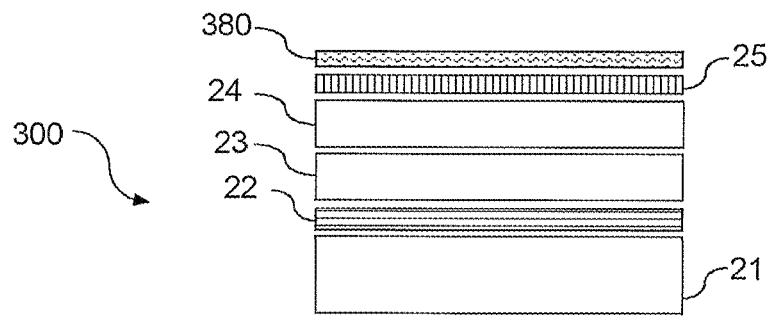
FIG. 13 schematically depicts layers of a non-touch-sensitive display device including an antiglare layer.

Thus, sparkle may be reduced by minimizing the distance between the pixels and the antiglare layer. FIG. 13 depicts a non-touch display device 300 having the same components as described above with respect to FIG. 2 with the addition of an antiglare layer 380 positioned at a surface of the polarizer substrate 28. The antiglare layer 380 may be provided by a film or a coating, a separate antiglare glass substrate, or surface features impressed on the surface of the polarizer substrate 28. In other words, the antiglare layer 380 may be configured as any surface or treatment capable of providing the antiglare effects described herein. Exemplary techniques for providing antiglare layer features on a surface of a glass substrate are described in U.S. Pat. Publ. No. 2011/0267697 filed on Apr. 20, 2011, which is hereby incorporated herein in its entirety. As stated above, by using thin layers, the mechanical thickness, and therefore the distance between the pixel substrate 23 may be minimized. By minimizing this distance, the amplitude of sparkle is reduced. For example, by using a color filter substrate 14 with a thickness in the order of 0.10 mm that is bonded to a polarizer substrate 25 with a thickness in the order of 0.10 mm, and by roughening the surface of the polarizer layer to provide the antiglare layer 380, the mechanical distance may be as small as 0.20 mm, thereby corresponding to an optical distance of about 0.14 mm.

However, as described above, in the case of touch-sensitive display devices, additional layers are needed to provide the touch-sensitive capability. To achieve short distances from the array of pixels to the antiglare layer, multiple configurations are possible. Referring to the display device 400 depicted in FIG. 14A, to insure the rigidity of the display device, a relatively thick cover glass substrate 29 is usually preferred. Although positioning the antiglare layer on the top surface of the cover glass substrate 29 is possible, doing so provides an increased distance between the pixel substrate 23 and the antiglare layer. Alternatively, the antiglare layer may be provided on a back surface of the cover glass layer 29, and the cover glass substrate 29 may be have an antireflective coating 30 to eliminate reflections coming from the front side of the display device. In this case, the function of the antiglare layer is to eliminate the reflections coming from the layers located inside the display device.

Figure 14A:
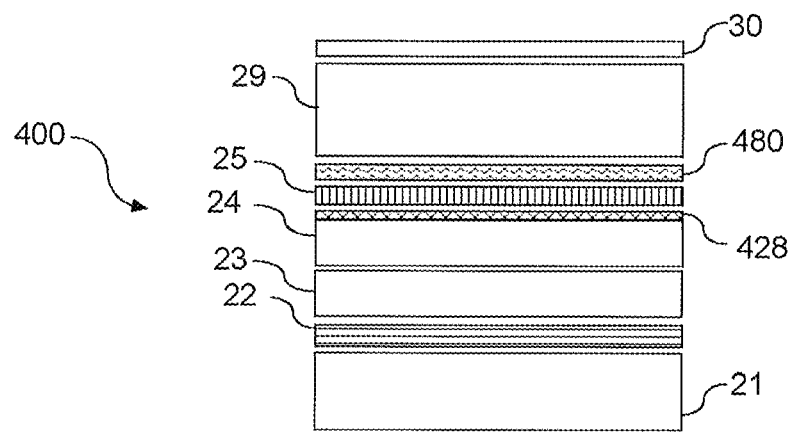
FIGS. 14A and 14B schematically depict layers of touch-sensitive display devices including an antiglare layer positioned below a cover glass substrate.
Figure 14B:
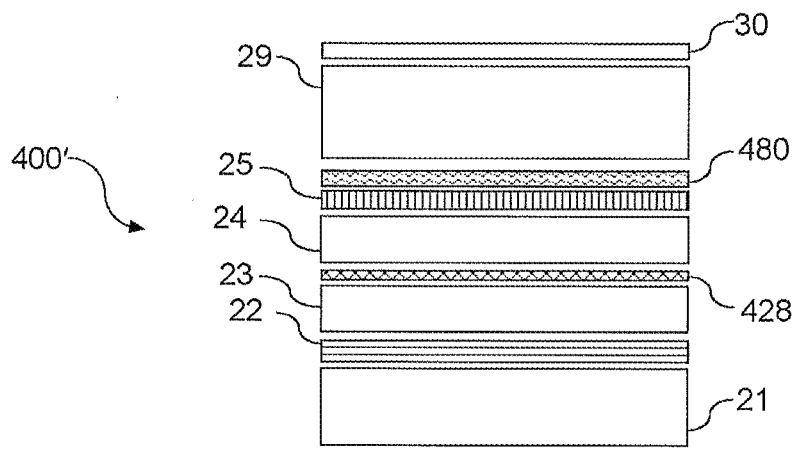

Referring to FIGS. 14A and 14B, another option is providing the touch sensitive layer 428 (without a glass substrate) in the form of an ITO grid providing touch capabilities in the x- and y-directions. FIG. 14A shows such a touch sensitive layer 428 positioned on the color filter substrate 24 of the display device 400 (i.e., an "on-cell" structure), while FIG. 14B shows display device 400' having a touch sensitive layer 428 positioned on the pixel substrate 23 (i.e., an "in-cell" structure). In some embodiments, a touch sensitive layer may be provided on both the pixel substrate 23 and the color filter substrate 24. The antiglare layer 480 may then be disposed on a polarizer substrate 25. In some embodiments, the display device does not require the use of an additional cover glass layer 29, and the structure that contributes to the optical distance under consideration only contains the color filter substrate 24 and a polarizer substrate 25, such as in the non-touch case depicted in FIG. 13. In keeping the thickness of the layers to a minimum as described above, the amplitude of sparkle may be reduced.

Figure 15:
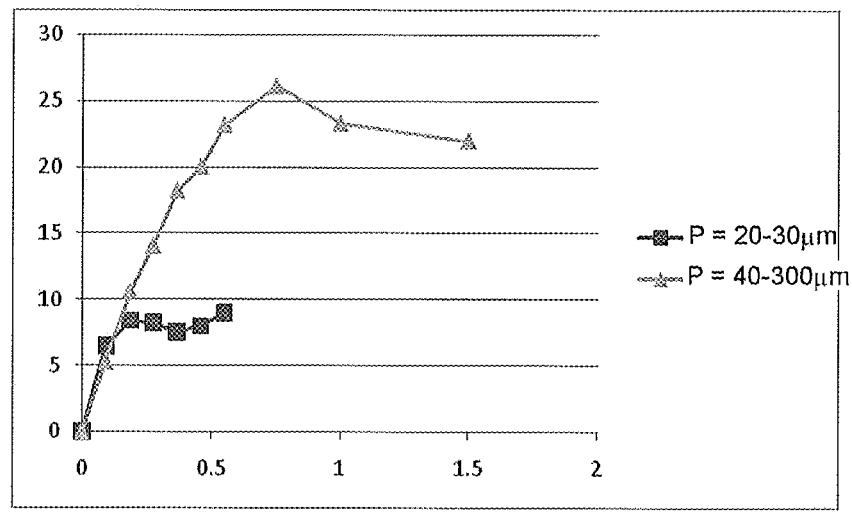
FIG. 15 graphically depicts PPD versus distance of the antiglare layer to the array of pixels for a first antiglare layer having periods between 20 μm and 30 μm and a second antiglare layer having periods between 40 μm and 300 μm.

In addition to the distance that the antiglare layer is positioned from the array of pixels, the configuration of the antiglare layer may be manipulated to reduce sparkle, even in cases where the antiglare layer is positioned relatively far from the array of pixels. As described in detail below, in the case of high-resolution display devices (e.g., display devices having a pixel pitch that is less than about 120 μm), the surface features of the antiglare layer may be configured such that the antiglare layer has a typical focal length of at least four times larger than the optical distance of the antiglare layer to the array of pixels (or at least three times smaller than the optical distance of the antiglare layer to the array of pixels in the case of surfaces having an annulus power spectral density) to reduce the amplitude of sparkle that may be visible to an observer Generally, as stated above, when measuring or modeling the amount of sparkle versus the optical distance between the array of pixels and the antiglare layer, sparkle rapidly increases when starting from a zero distance, and then reaches a plateau and slowly decreases afterward. The shape of the curve is a function of the geometry of the array of pixels and the frequency content of the antiglare layer. FIG. 15 is a chart that shows the sparkle amplitude with the pixel pitch of the array of pixels fixed to 80 μm for two different types of antiglare layers. The curve indicated by squares corresponds to an antiglare layer that presents mostly high frequencies (i.e., its PSD is an annular function restricted to 20-30 μm periods similar to the power spectral density shown in FIG. 25 and the surface shown in FIG. 26). The curve indicated by triangles contains much more low frequencies (i.e., its PSD is an annular function restricted to 40-300 μm periods). With high-frequency antiglare layer, the plateau is reached for very small distances between the array of pixels and the antiglare layer, and the amplitude of the plateau is much lower than the other antiglare layer having a low-frequency.

As stated above, an antiglare layer may be compared with an array of random microlenses, and sparkle is the result of both refraction effect (geometrical optics) and diffraction effects. Momentarily neglecting the diffraction aspect, sparkle is expected to be the worst when the focal length of the microlenses is equal to the optical distance from the pixels (i.e., measured from a bottom surface of the color filter substrate) to the lens itself (i.e., the antiglare layer). When the focal length of the microlenses is equal to the optical distance, the observer line of sight is focused on the gap between the pixels where the lens turns dark, or on the pixel itself wherein the lens turns bright.

Embodiments of the present disclosure minimize the amplitude of sparkle by use of an antiglare layer having a typical focal length that is either much larger or much smaller than an optical distance between the array of pixels and the antiglare layer. As used herein, the phrase "typical focal length" means a focal length of the antiglare layer that is determined by the following:

1. Calculate the second partial derivative of the antiglare layer:

$$B(x,y) = d^2 A(x,y)/dx, \quad \text{Equation 10}$$

where:
A(x,y) is the topology of the antiglare layer,
B(x,y) is the second derivative, and
X is the direction of the red, green, and blue sub-pixels in the display panel (i.e., the color direction).

2. Calculate the local radius of curvature at a particular location:

$$R(x,y) = 1/B(x,y), \quad \text{Equation 11}$$

where R(x,y) is the local radius of curvature.

3. Calculate the local focal length $$F(x,y) = R(x,y)/(n_1 - n_2), \quad \text{Equation 12}$$

where: $F(x,y) = R(x,y)/(n2-n1)$
F(x,y) is the local focal length, and
$n_1$ and $n_2$ are the indices of refraction of the material defining the antiglare layer (where $n_1 = 1$ in the case where the antiglare layer is in contact with air).

4. Calculate the histogram of the distribution F(x,y) across the antiglare layer to determine the typical focal length f0, wherein the typical focal length f0 is the focal length that has the most degree of occurrence on the antiglare layer.

Figure 16:
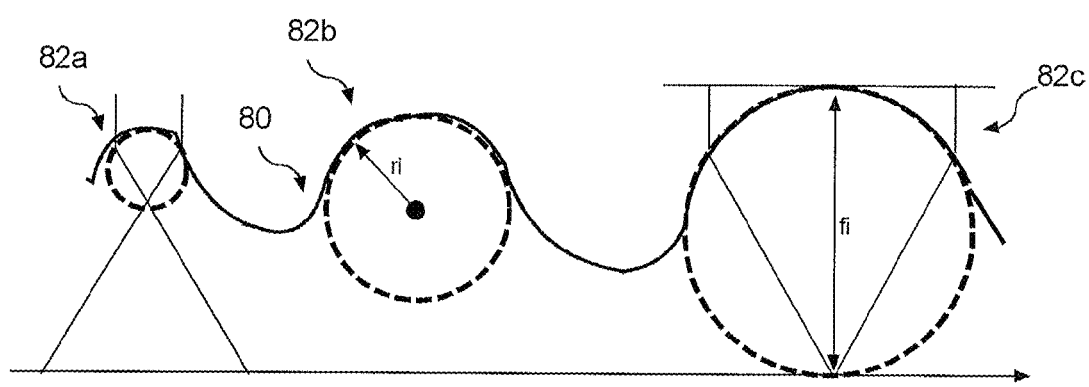
FIG. 16 schematically depicts three surface features of an antiglare layer.

Referring now to FIG. 16, an antiglare layer 80 is schematically depicted. Each surface feature 82a-82c has a local radius of curvature ri and a local focal length fi that is determined by ri/($n_1 - n_2$), where $n_1$ and $n_2$ are the indices of refraction of both sides of the antiglare layer. When the antiglare is located on the last surface, it is in contact with air and the local focal length is then given by ri/(n−1). The three surface features 82a-82c have varying radii ri and amplitude A. For example, surface feature 82a has a smaller local radius of curvature ri and therefore a shorter local focal length fi as compared to surface feature 82c. The focal length fi that occurs most frequently across the antiglare layer is the typical focal length f0 of the antiglare layer.

Figure 17:
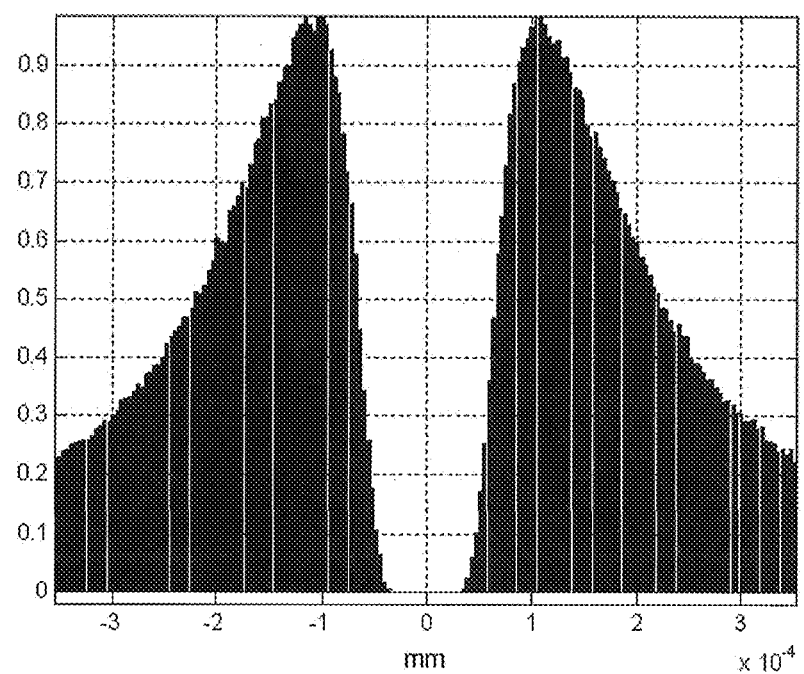
FIG. 17 depicts a focal length histogram corresponding to the first antiglare layer having periods of 20 μm to 30 μm.
Figure 18:
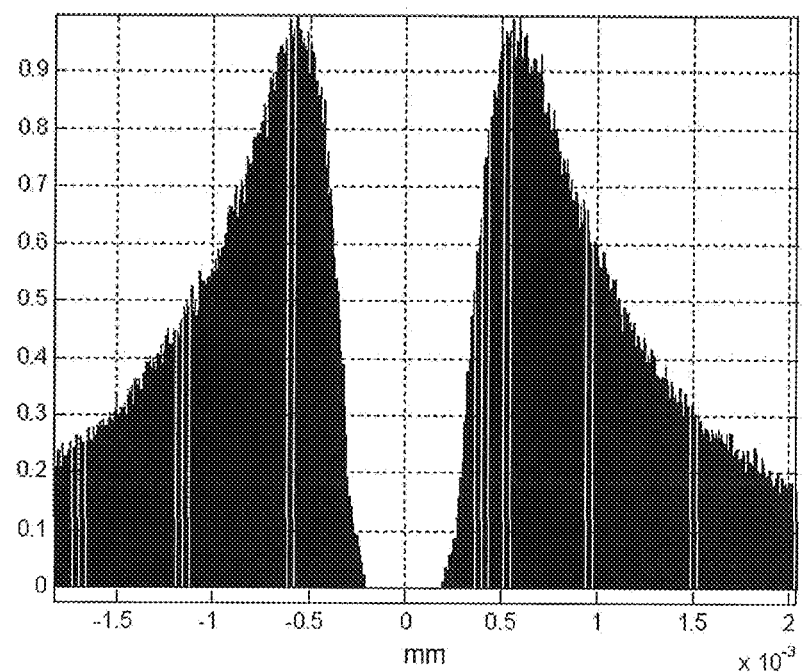
FIG. 18 depicts a focal length histogram corresponding to the second antiglare layer having periods of 40 μm to 300 μm.

Typical focal lengths were calculated as described above for two computer generated antiglare layers having surface feature periods of 20 μm to 30 μm (the same antiglare layer corresponding to the high-frequency curve of FIG. 15) and periods of 40 μm to 300 μm (the same antiglare layer corresponding to the low-frequency curve of FIG. 15), respectively. FIG. 17 depicts a focal length histogram corresponding to the antiglare layer having periods of 20 μm to 30 μm. As shown in the histogram, the typical focal length is about 0.11 mm, which corresponds reasonably well to the maximum of the high-frequency sparkle curve depicted in FIG. 15. FIG. 18 depicts a focal length histogram corresponding to the antiglare layer having surface feature periods of 40 μm to 300 μm. The histogram of FIG. 18 shows that the typical focal length is shifted to about 0.65 which, again, corresponds reasonably well to the maximum of the low-frequency sparkle curve of FIG. 15.

Accordingly, the typical focal length of an antiglare layer may be determined and manipulated to affect the occurrence of sparkle.

Figure 19:
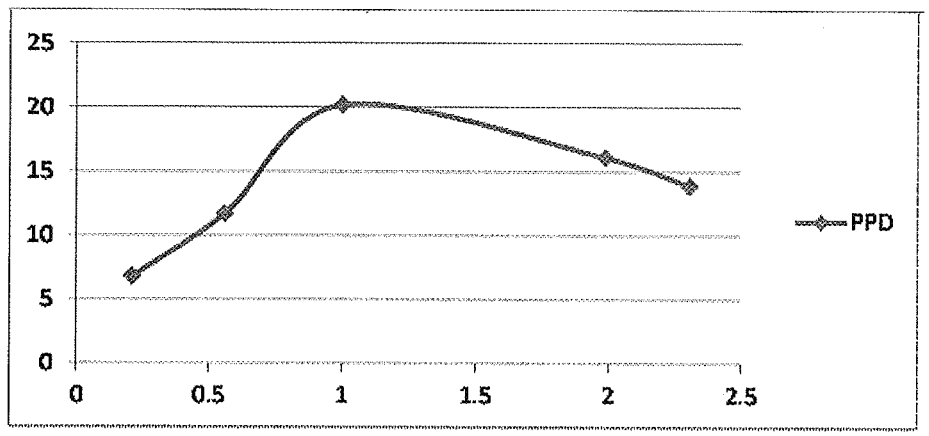
FIG. 19 graphically depicts PPD versus the ratio between typical focal length and distance of the antiglare layer from the array of pixels.

Another way to illustrate the effect of the typical focal length of the antiglare layer is to fix the distance $d_0$ of the antiglare layer from the array of pixels, and consider different antiglare layers with different frequency content and therefore different typical focal lengths. The sparkle amplitude may be plotted versus the ratio between the typical focal length and the distance $d_0$. As described above, the expectation is that the sparkle occurrence should be the highest when the ratio between the typical focal length and the distance $d_0$ is 1. FIG. 19 depicts such a chart that plots the occurrence of sparkle in terms of PPD versus the ratio between the typical focal length and the distance $d_0$. As shown in the chart, the maximum sparkle in terms of PPD occurs when the ratio is equal to 1.

Generally, the pixel to antiglare layer distance is not a variable parameter and is fixed by some mechanical constrains, as described above. In most applications, this mechanical distance is at least 1.0 mm because the thickness of the color filter substrate is generally in the order of 0.50 mm, and the thickness of the polarizer and other various layers that may be in the optical path also contribute to the thickness of the display device. As explained above, to avoid sparkle, the surface should be such that the typical focal length is very different from the pixel to antiglare layer distance. If the antiglare layer were designed such that the typical focal length is larger than the mechanical distance of 1.0 mm, it can be shown that such an antiglare layer would need to have extremely low roughness frequencies, which means that the diffusion angle would be very narrow and the glare not efficiently eliminated.

The other option is to choose an antiglare layer with a typical focal length that is significantly smaller than 1 mm, which means that the surface needs to have mostly high spatial frequency content, such as surface features having a period in the 20-30 μm range. In the particular case of high resolution displays with pixel pitches smaller than 120 μm, it can be shown that, to operate in the mode where the typical focal length is significantly smaller than 1 mm and get an acceptable level of sparkle, one needs to use an antiglare layer with very high frequencies (e.g., greater than $1/20$ microns$^{-1}$). However, the consequence of such high-frequency surface is that the surface has a very high haze, and the image resolution is adversely affected. Therefore, it is difficult to achieve low sparkle, low haze and maintained high image resolution at the same time together.

Figure 20:
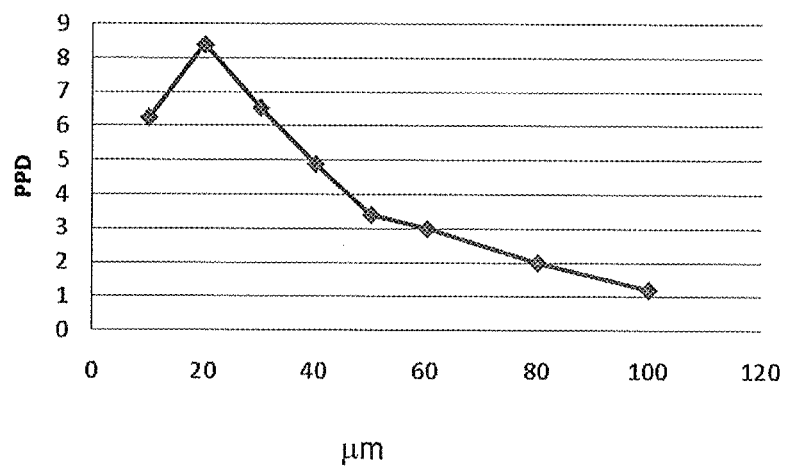
FIG. 20 graphically depicts the evolution of sparkle as a function of the antiglare layer frequency content.

In some embodiments of the present disclosure, display devices have an antiglare layer with a low spatial frequency arranged at a small distance from the array of pixels. In other words, the typical focal length of the antiglare layer is larger than the optical distance between the array of pixels and the antiglare layer. FIG. 20 is a chart depicting the evolution of sparkle as a function of the antiglare layer frequency content calculated using the following conditions:

1. PSD is a nearly Gaussian with a $1/e^2$ frequency corresponding to the cutoff period on the chart;
2. Amplitude of phase modulation of the antiglare layer is 100 nm RMS;
3. Pixel pitch is 80 microns;
4. Index of refraction is 1.5; and
5. Optical distance between the array of pixels and the antiglare layer is 0.2 mm (around 0.3 mm mechanical distance).

As can be seen from the chart of FIG. 20, the cutoff period should to be at least 40 μm to get below a sparkle level of 5% in the case where the optical distance between the array of pixels and the antiglare layer is 0.2 mm. This corresponds to a typical focal length around seven times the optical distance between the array of pixels and the antiglare layer. The cutoff period may be further increased, but the diffusion provided by the antiglare layer will become really low, resulting in eliminating the glare less efficiently. It should be understood that the typical focal length of the antiglare layer may be configured to have a PPD other than 5% (i.e., a typical focal length other than seven times the optical distance). The target PPD may depend on the desired characteristics of the antiglare layer. The chart of FIG. 20 shows that the typical focal length should be large relative to the optical distance between the array of pixels and the antiglare layer.

Figure 21:
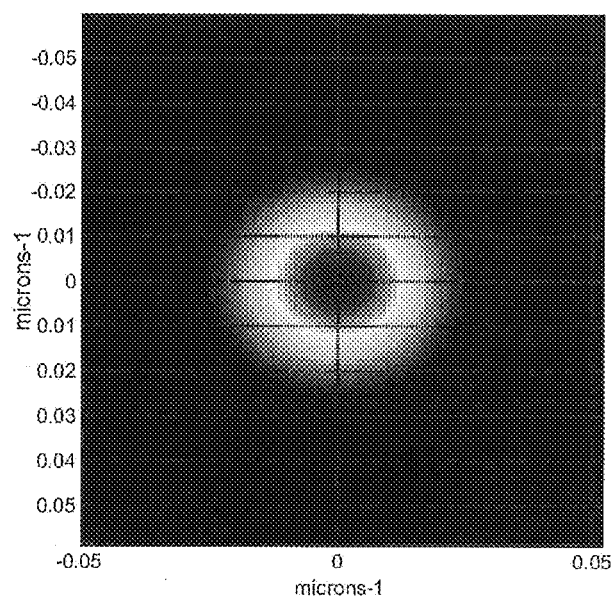
FIG. 21 graphically depicts a Gaussian power spectral density with a $1/e^2$ frequency corresponding with an antiglare layer having a 40 μm cutoff period.
Figure 22:
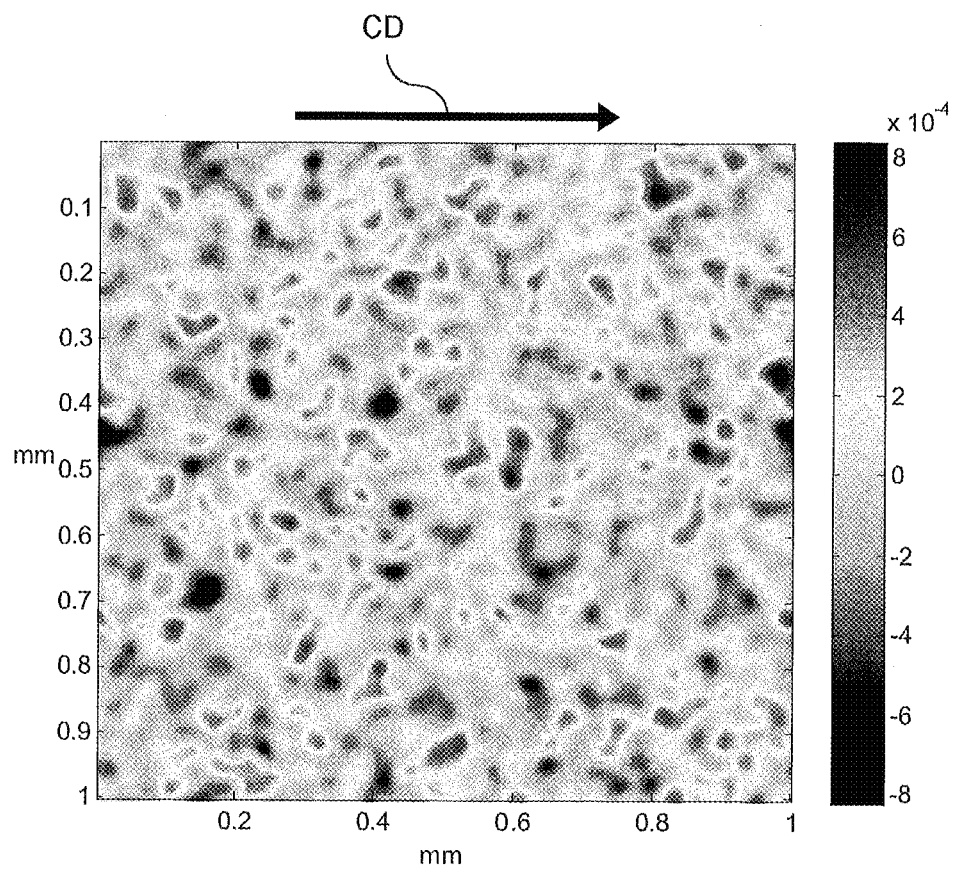
FIG. 22 depicts an antiglare layer having a surface texture with a power spectral density as depicted in FIG. 21.

FIG. 21 depicts an exemplary circularly symmetric Gaussian PSD with a $1/e^2$ frequency corresponding with an antiglare layer having a 40 μm cutoff period and a surface roughness of 0.2 μm RMS. FIG. 22 depicts an exemplary surface texture of an antiglare layer having the PSD as shown in FIG. 21. The calculated typical focal length of the surface depicted in FIG. 22 is about 1.2 mm, which means that the optical distance between the array of pixels and the antiglare layer should be less than 0.19 mm. Assuming 1.5 as the index of refraction of the materials of the display device in the optical path, the mechanical distance should be less than 0.285 mm. It should be understood that the PSD illustrated in FIG. 21 and the surface texture illustrated in FIG. 22 are provided for nonlimiting, illustrative purposes only.

It is noted that antiglare layers having low spatial frequencies may also result in relatively low diffusion angles, which may eliminate glare less effectively than antiglare layers with high spatial frequencies. It can be shown that the shape of the antiglare layer is most significant in the color direction CD (i.e., the RGB sub-pixel direction) of the display device. In some embodiments, the surface features of the antiglare layer may be configured as non-rotationally symmetric such that the surface features are longer in the color direction CD of display device than in the opposite direction. Therefore, by using an antiglare layer with an elliptical PSD having a minor axis along the color direction of the display device, and a major axis in a direction opposite from the color direction (see FIG. 23 for an example), the sparkle may be minimized while increasing the angle of diffusion over antiglare layers having a circular PSD.

Figure 23:
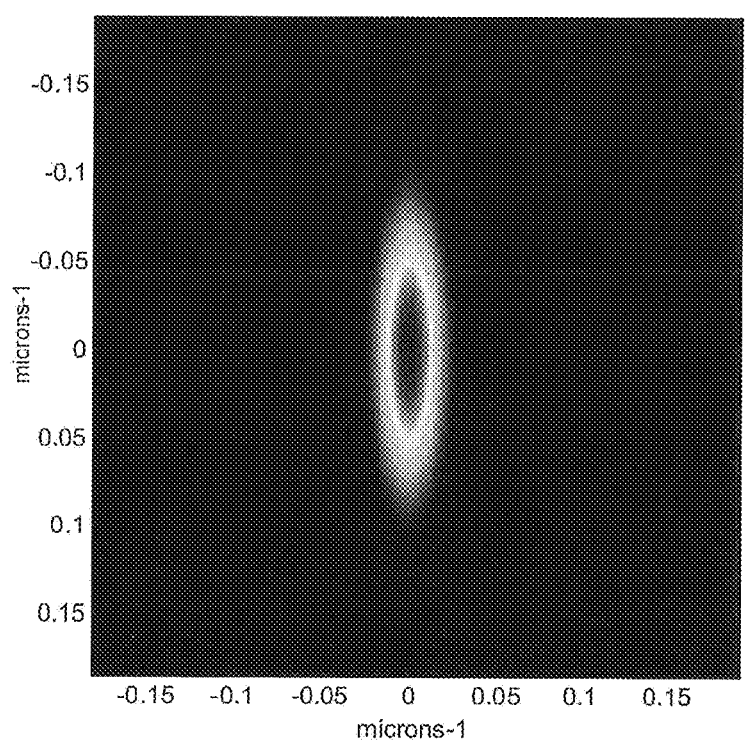
FIG. 23 depicts an elliptical Gaussian power spectral density with $1/e^2$ frequency of $1/40$ microns$^{-1}$ in the color direction, and $1/10$ microns$^{-1}$ in the opposite direction.

FIG. 23 shows a PSD that is an elliptical Gaussian function with $1/e^2$ frequency of $1/40$ microns$^{-1}$ in the color direction, and $1/10$ microns$^{-1}$ in a direction orthogonal to the color direction CD. The amplitude of the roughness is 0.2 microns RMS. Accordingly, as an example and not a limitation, an elliptical PSD of an antiglare layer may have a $1/e^2$ frequency that is four times smaller in the color direction than in the opposite direction.

Figure 24:
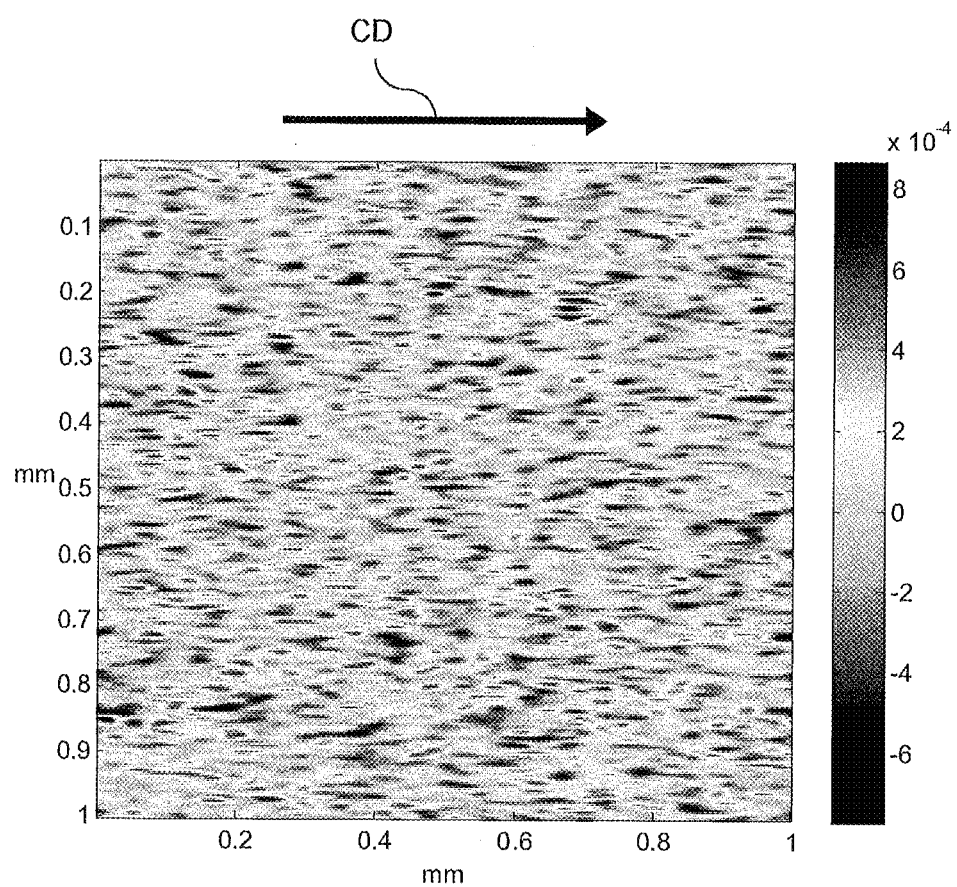
FIG. 24 depicts an antiglare layer having a surface texture with an elliptical power spectral density as depicted in FIG. 23.

FIG. 24 depicts an exemplary surface texture of an antiglare layer having the elliptical PSD as shown in FIG. 23. As shown in FIG. 24, the antiglare layer has a period that is longer in the color direction CD than in a direction orthogonal to the color direction CD. The typical focal length of the antiglare layer depicted in FIG. 23 is the same as the antiglare layer depicted in FIG. 21.

As stated above, in some embodiments, the antiglare layer may have an annulus shaped PSD (i.e., donut-shaped), wherein the low spatial frequencies responsible for creating sparkle are concurrently eliminated with the high spatial frequencies responsible for creating haziness. Referring now to FIG. 25, an annulus PSD of an exemplary antiglare surface is graphically depicted. As shown in FIG. 25, the annulus PSD is centered at $1/20$ microns$^{-1}$. Accordingly, undesirable low and high spatial frequencies are not present such that sparkle may be reduced without the appearance of significant haziness.

Figure 25:
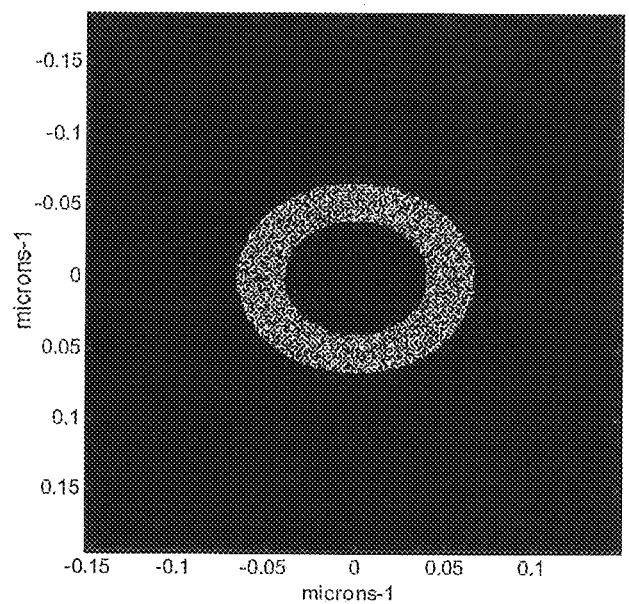
FIG. 25 depicts an annulus power spectral density centered on $1/20$ microns$^{-1}$.
Figure 26:
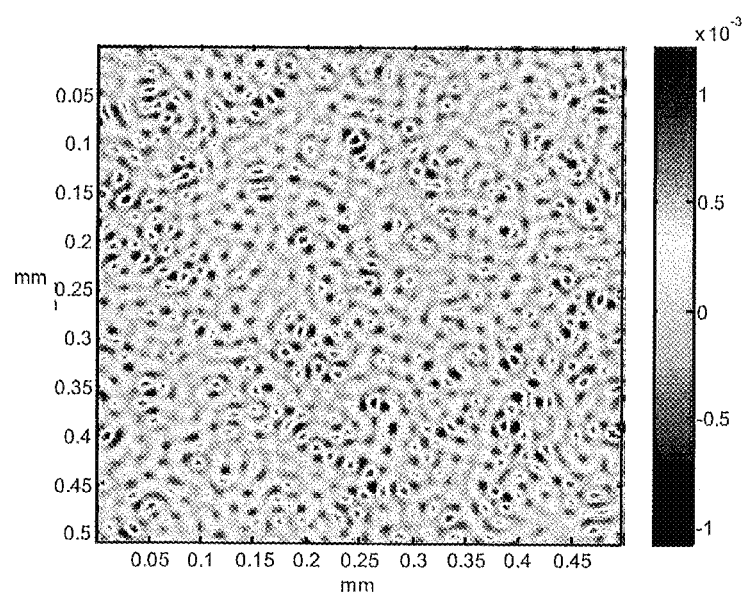
FIG. 26 depicts an antiglare layer having a surface texture with an annulus power spectral density as depicted in FIG. 25.

FIG. 26 depicts an exemplary surface texture of an antiglare layer having the annulus PSD as shown in FIG. 25. As shown in FIG. 26, the antiglare layer has surface features with periods within a range defined by the annulus PSD (i.e., low and high spatial frequencies are not present).

Figure 27:
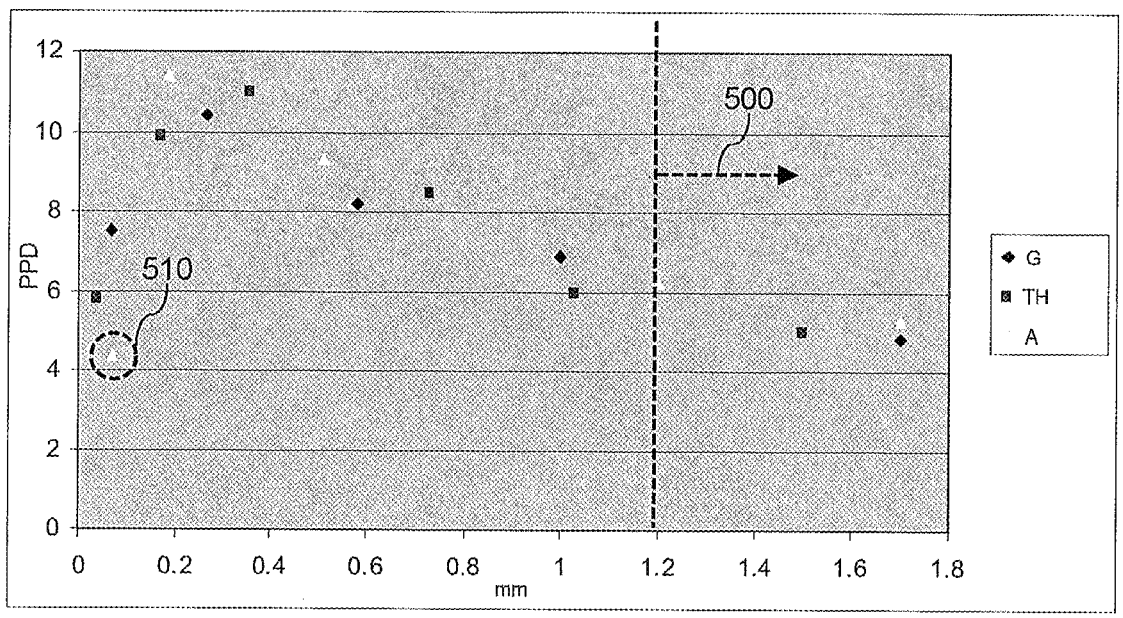
FIG. 27 graphically depicts PPD versus typical focal length for three antiglare surfaces having different PSD shapes.

Referring now to FIG. 27 a chart is provided that depicts the amplitude of sparkle versus the typical focal length for three antiglare layers having different PSD shapes. The optical distance from the array of pixels to the antiglare layer was set to 0.20 mm, the amplitude of phase modulation was 125 nm in transmission, and the pixel pitch was set to 80 μm in the simulation represented by the chart of FIG. 27. The three antiglare layers had the following PSD shapes: the data points represented by a diamond shape correspond to an antiglare layer having a Gaussian distribution, the data points represented by a square shape correspond to an antiglare layer having a top hat distribution (i.e., a rectangular shape), and the data points represented by a triangle correspond to an antiglare layer having an annular distribution.

As may be seen from the chart, sparkle is at a peak for a typical focal length around 0.30 mm, which corresponds to the optical distance from the array of pixels to the antiglare layer. The chart shows that two different types of antiglare layers are capable of generating low sparkle levels. First, antiglare layers having a typical focal length that is much larger that the pixel to AG surface are capable of generating low sparkle levels. For example and referring to the chart of FIG. 27, to achieve a PPD of about 6, the typical focal length should be about 1.2 mm, as indicated by arrow 500, which corresponds to a typical focal length that is about six times larger than the optical distance from the array of pixels to the antiglare layer. To achieve a PPD of about 6, the typical focal length should be around seven times larger than the optical distance, which corresponds to the chart illustrated in FIG. 20. The typical focal length is dependent on the desired parameters of the antiglare layer and the level of sparkle that is intended to be reduced. Generally, antiglare layers having a typical focal length that is at least four times larger than the optical distance may minimize the amplitude of sparkle.

Second, antiglare layers having a typical focal length that is smaller than the optical distance between the array of pixels and the antiglare layer (e.g., at least three times smaller than the optical distance) may also minimize the amplitude of sparkle. However, as described above, antiglare layers having a typical focal length that is small possess high spatial frequencies, which generate undesirable haze. Therefore, antiglare layers having an annulus-shaped PSD and a small typical focal length (e.g., represented by the encircled data point 510) eliminate the high spatial frequencies and tend to create a less haziness appearance because the high frequency tail that is usually present in conventional surfaces, such as surfaces having a Gaussian PSD, is eliminated.

It should now be understood that embodiments of the present disclosure provide display devices having an antiglare layer that both reduces glare and minimizes the appearance of sparkle. The antiglare layers described herein may have a typical focal length that is large compared to an optical distance between an array of pixels of the display device and the antiglare layer (e.g., at least four times larger), or small compared to the optical distance between the array of pixels of the display device and the antiglare layer (e.g., at least three times smaller). In some embodiments, the antiglare layer may have an elliptical power spectral density function in the frequency space having a minor axis aligned with a color direction of the display device, and a major axis aligned in the opposite direction. In other embodiments, particularly where the typical focal length is small, the antiglare layer may have an annulus-shaped power spectral density.

It is noted that the terms "approximately" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A display device comprising:
   a pixel substrate comprising an array of pixels; and
   an antiglare layer positioned with respect to the pixel substrate, the antiglare layer comprising a surface roughness having a spatial frequency such that a typical focal length of the antiglare layer is either at least four times larger than an optical distance between a surface of the array of pixels and the antiglare layer, or at least three times smaller than the optical distance between the surface of the array of pixels and the antiglare layer.

2. The display device of claim 1, wherein the typical focal length of the antiglare layer is at least three times smaller than the optical distance between the surface of the array of pixels and the antiglare layer, and a power spectral density of the antiglare layer has an annulus shape.

3. The display device of claim 1, wherein the optical distance from the array of pixels to the antiglare layer is less than 0.30 mm.

4. The display device of claim 1, wherein an amplitude of a phase modulation of light transmitted by the antiglare layer is at least 100 nm.

5. The display device of claim 1, further comprising:
   a color filter substrate adjacent to the pixel substrate; and
   a polarizer substrate adjacent to the color filter substrate, wherein the antiglare layer is positioned on a surface of the polarizer substrate.

6. The display device of claim 5, wherein a thickness of the polarizer substrate is about 0.1 mm.

7. The display device of claim 1, further comprising:
   a color filter substrate positioned on the surface of the array of pixels; and
   a touch-sensitive layer.

8. The display device of claim 7, further comprising:
   a cover glass substrate; and
   an antireflective layer on a surface of the cover glass substrate.

9. The display device of claim 7, further comprising a polarizer substrate, wherein the touch-sensitive layer is positioned on the color filter substrate or the pixel substrate, and the antiglare layer is positioned on an outer surface of the polarizer substrate.

10. The display device of claim 9, further comprising a cover glass substrate and an antireflective layer positioned on an outer surface of the cover glass substrate.

11. The display device of claim 1, wherein the surface roughness of the antiglare layer is defined by periods greater than 40 μm.

12. The display device of claim 1, wherein a pixel pitch of the array of pixels is less than 120 μm.

13. The display device of claim 1, wherein a pixel pitch of the array of pixels is about 80 μm.

14. The display device of claim 1, wherein the surface of the antiglare layer is defined by surface features providing an elliptical power spectral density.

15. The display device of claim 14, wherein the elliptical power spectral density has a minor axis aligned with a color direction of the array of pixels.

16. The display device of claim 1, wherein the surface of the antiglare layer is defined by non-rotationally symmetric surface features.

17. The display device of claim 1, wherein the antiglare layer is provided on an antiglare glass substrate.

18. The display device of claim 1, wherein a pixel pitch of the array of pixels is less than about 120 μm, and the optical distance from the pixel substrate to the antiglare layer is less than about 0.30 mm.

19. A display device comprising:
   a pixel substrate comprising an array of pixels;
   an antiglare layer positioned with respect to the pixel substrate, the antiglare layer comprising a surface roughness having a spatial frequency such that a typical focal length of the antiglare layer is at least four times larger than an optical distance between a surface of the array of pixels and the antiglare layer, wherein surface features of the antiglare layer are non-rotationally symmetric;
a color filter substrate positioned on the surface of the array of pixels;
a touch-sensitive layer; and
a polarizer substrate.

20. The display device of claim 19, further comprising:
a cover glass substrate positioned adjacent to the touch-sensitive layer; and
an antireflective layer on an outer surface of the cover glass substrate.

21. The display device of claim 19, wherein the surface features provide an elliptical power spectral density having a minor axis that is aligned with a color direction of the array of pixels.

22. The display device of claim 19, wherein the optical distance between the surface of the array of pixels and the antiglare layer is less than or equal to 0.30 mm.

23. A display device comprising:
a pixel substrate comprising an array of pixels; and
an antiglare layer positioned with respect to the pixel substrate, the antiglare layer comprising a surface roughness having a spatial frequency such that a typical focal length of the antiglare layer is at least four times larger than an optical distance between a surface of the array of pixels and the antiglare layer.

24. A display device comprising:
a pixel substrate comprising an array of pixels; and
an antiglare layer positioned with respect to the pixel substrate, the antiglare layer comprising a surface roughness having a spatial frequency such that a typical focal length of the antiglare layer is at least three times smaller than an optical distance between a surface of the array of pixels and the antiglare layer, and a power spectral density of the antiglare layer has an annulus shape.

* * * * *